US009375908B2

(12) United States Patent  
Metschan et al.

(10) Patent No.: US 9,375,908 B2  
(45) Date of Patent: Jun. 28, 2016

(54) FLEXIBLE MATERIAL TRANSFER DEVICES, FLEXIBLE VACUUM COMPACTION DEVICES, FLEXIBLE VACUUM CHUCKS, AND SYSTEMS AND METHODS INCLUDING THE SAME

(71) Applicant: The Boeing Company, Seal Beach, CA (US)

(72) Inventors: Stephen Lee Metschan, Black Diamond, WA (US); Richard V. Phillips, Enumclaw, WA (US); Daniel M. Rotter, Kent, WA (US)

(73) Assignee: The Boeing Company, Chicago, IL (US)

( * ) Notice: Subject to any disclaimer, the term of this patent is extended or adjusted under 35 U.S.C. 154(b) by 422 days.

(21) Appl. No.: 13/887,006

(22) Filed: May 3, 2013

(65) Prior Publication Data

US 2014/0367037 A1 Dec. 18, 2014

(51) Int. Cl.
*B32B 38/18* (2006.01)
*B29C 70/34* (2006.01)
*B29C 70/54* (2006.01)

(52) U.S. Cl.
CPC ........... *B32B 38/1858* (2013.01); *B29C 70/342* (2013.01); *B32B 38/1866* (2013.01); *B29C 70/543* (2013.01); *Y10T 156/17* (2015.01)

(58) Field of Classification Search
CPC  B29C 70/44; B29C 70/543; B29C 66/81455; B29C 66/8161; B32B 37/10; B32B 37/1018; B32B 38/1858
USPC ........................................ 156/285, 286, 385
See application file for complete search history.

(56) References Cited

U.S. PATENT DOCUMENTS 2,679,278 A 5/1954 Clark  
5,273,553 A * 12/1993 Hoshi ............... H01L 21/67092  
                                                    148/DIG. 6

(Continued)

FOREIGN PATENT DOCUMENTS

EP          2796263      10/2014  
WO   WO 2007/039085     4/2007

OTHER PUBLICATIONS

Partial European Search Report for related European application EP 14194210, dated May 8, 2015.

(Continued)

*Primary Examiner* — Christopher Schatz  
(74) *Attorney, Agent, or Firm* — DASCENZO Intellectual Property Law, P.C.

(57) ABSTRACT

Flexible material transfer devices, flexible vacuum compaction devices that include the flexible material transfer devices, flexible vacuum chucks that include the flexible vacuum compaction devices, and systems and methods including the same. The flexible material transfer devices include a flexible substrate that is configured to selectively and repeatedly transition between a stowed conformation and a deployed conformation. The flexible substrate defines a material contacting surface that is configured to contact a charge of composite material and to selectively and operatively attach to the charge of composite material. The flexible substrate further defines a plurality of retention conduits that are at least partially defined by the material contacting surface and are configured to have a retention vacuum applied thereto. The flexible material transfer device further includes a retention manifold that provides fluid communication between the plurality of retention conduits and a vacuum source.

17 Claims, 13 Drawing Sheets

(56) References Cited

U.S. PATENT DOCUMENTS

| | | |
|---|---|---|
| 7,228,611 B2 | 6/2007 | Anderson et al. |
| 7,527,222 B2 | 5/2009 | Biornstad et al. |
| 7,624,488 B2 | 12/2009 | Lum et al. |
| 7,879,177 B2 | 2/2011 | McCowin et al. |
| 8,157,212 B2 | 4/2012 | Biornstad et al. |
| 8,168,023 B2 | 5/2012 | Chapman et al. |
| 8,182,628 B2 | 5/2012 | Biornstad et al. |
| 2009/0008825 A1* | 1/2009 | Eberth .................. B29C 31/008 264/308 |
| 2010/0011580 A1 | 1/2010 | Brennan et al. |
| 2010/0012260 A1 | 1/2010 | Brennan et al. |
| 2012/0080142 A1* | 4/2012 | Kulik .................... B29C 33/405 156/213 |

OTHER PUBLICATIONS

Extended European Search Report for related European application EP 14194210, dated Aug. 28, 2015.
U.S. Appl. No. 13/626,452, filed Sep. 25, 2012, Robins et al.
U.S. Appl. No. 13/693,887, filed Dec. 4, 2012, Rotter et al.
U.S. Appl. No. 13/732,961, filed Jan. 2, 2013, Rotter et al.
U.S. Appl. No. 13/769,022, filed Feb. 15, 2013, Robins et al.

* cited by examiner

FLEXIBLE MATERIAL TRANSFER DEVICES, FLEXIBLE VACUUM COMPACTION DEVICES, FLEXIBLE VACUUM CHUCKS, AND SYSTEMS AND METHODS INCLUDING THE SAME

FIELD

The present disclosure is directed generally to systems and methods for transferring and/or compacting a charge of composite material and more particularly to systems and methods that utilize a flexible substrate to transfer and/or compact the charge of composite material.

BACKGROUND

Historically, construction and/or assembly of a composite structure on a layup mandrel is a serial process that involves sequentially forming a plurality of support structures, such as stringers and/or spacers, on a surface of the layup mandrel, followed by locating a continuous, or at least substantially continuous, length of composite fibers around the surface of the layup mandrel to form a skin of the composite structure. This locating may be accomplished by wrapping the length of composite fibers around the surface of the layup mandrel, such as by rotating the layup mandrel with respect to a layup head that dispenses the length of composite fibers and/or by moving the layup head relative to the layup mandrel.

Generally, the support structures are formed from a plurality of plies, or layers, of a composite material, such as a pre-preg (or pre-impregnated) material, and each layer of the plurality of layers may be applied individually and/or sequentially to the surface of the layup mandrel. Similarly, the skin typically includes a plurality of layers, with each layer of the plurality of layers being applied individually and/or sequentially to the surface of the layup mandrel.

As composite structures become larger and more complex, such as may be the case for composite barrel assemblies for an airplane fuselage, the time required to perform the above-described serial processes becomes significant. In addition, a cost of layup mandrels for large and/or complex composite structures is substantial. Thus, there exists a need for improved material transfer devices, vacuum compaction devices, and/or vacuum chucks that may be utilized to assemble a composite structure.

SUMMARY

Flexible material transfer devices, flexible vacuum compaction devices that include the flexible material transfer devices, flexible vacuum chucks that include the flexible vacuum compaction devices, and systems and methods including the same. The flexible material transfer devices include a flexible substrate that is configured to selectively and repeatedly transition between a stowed conformation and a deployed conformation. The flexible substrate defines a material contacting surface that is configured to contact a charge of composite material and to selectively and operatively attach to the charge of composite material. The flexible substrate further defines a plurality of retention conduits that are at least partially defined by the material contacting surface and are configured to have a retention vacuum applied thereto. The flexible material transfer device further includes a retention manifold that provides fluid communication between the plurality of retention conduits and a vacuum source.

In some embodiments, the flexible substrate includes a first wall, a second wall, and a plurality of elongate webs that extend between the first wall and the second wall to define a plurality of elongate channels. In some embodiments, the retention manifold is defined, at least in part, by the plurality of elongate channels. In some embodiments, the flexible material transfer device further includes a suspension structure that is operatively attached to the flexible substrate. In some embodiments, the suspension structure forms a portion of the retention manifold.

In some embodiments, the flexible vacuum compaction device includes a plurality of evacuation conduits that are at least partially defined by the material contacting surface. In some embodiments, the flexible vacuum compaction device includes a sealing structure that is configured to form a fluid seal between the flexible substrate and a supporting surface of a layup mandrel that is configured to receive the charge of composite material. In some embodiments, the flexible vacuum compaction device further includes an evacuation manifold that provides fluid communication between the plurality of evacuation conduits and the vacuum source. In some embodiments, the evacuation manifold is defined, at least in part, by the plurality of elongate channels. In some embodiments, the suspension structure forms a portion of the evacuation manifold.

DESCRIPTION

Figure 1:
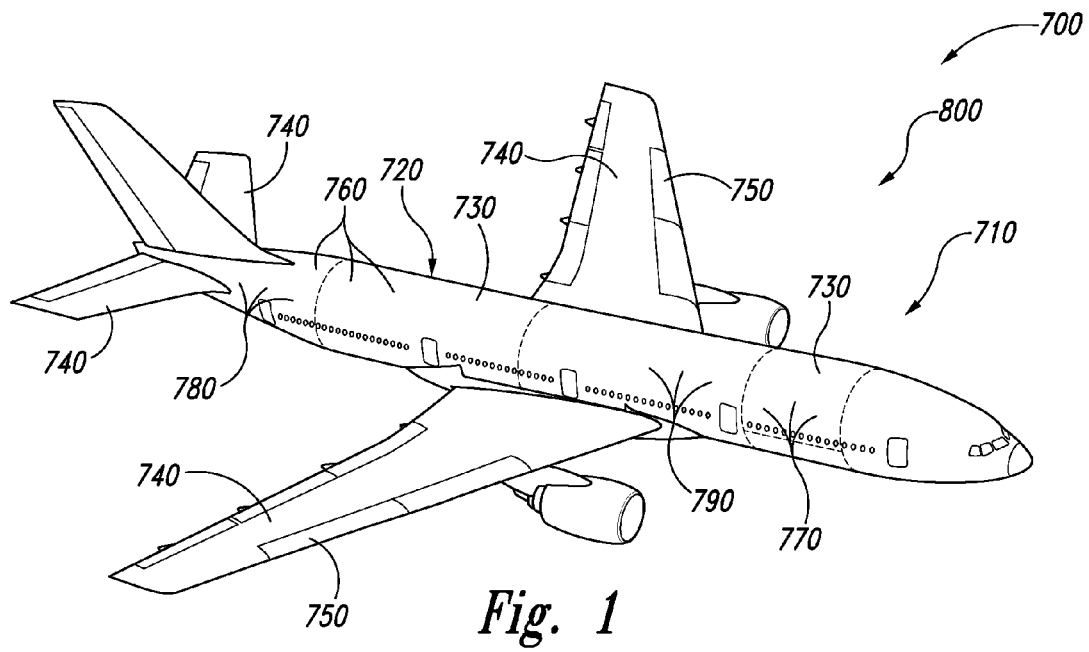
FIG. 1 is an illustrative, non-exclusive example of an aircraft that includes a composite structure that may be formed using the systems and methods according to the present disclosure.

FIGS. 1-24 provide illustrative, non-exclusive examples of composite structures 800, composite structure fabrication assembly 20, flexible material transfer devices 100, flexible vacuum compaction devices 90, rotating material transfer assemblies 80, and/or components thereof according to the present disclosure. Elements that serve a similar, or at least substantially similar, purpose are labeled with like numbers in each of FIGS. 1-24, and these elements may not be discussed in detail herein with reference to each of FIGS. 1-24. Similarly, all elements may not be labeled in each of FIGS. 1-24, but reference numerals associated therewith may be utilized herein for consistency. Elements, components, and/or features that are discussed herein with reference to one or more of FIGS. 1-24 may be included in and/or utilized with any of FIGS. 1-24 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
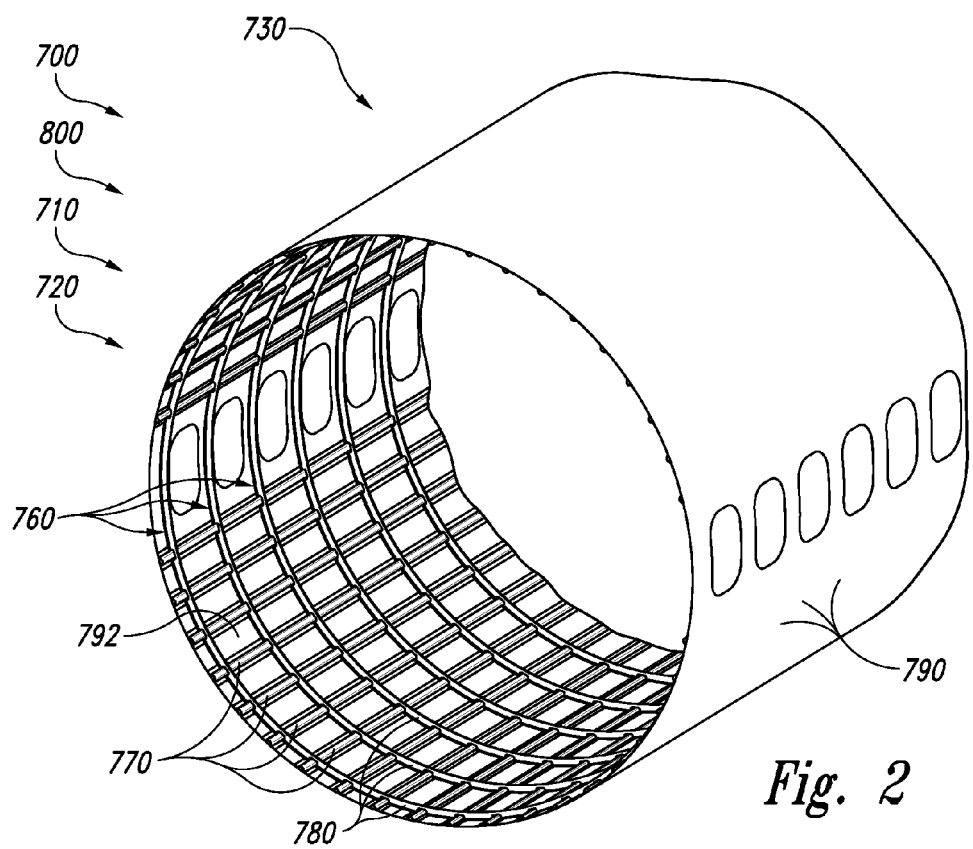
FIG. 2 is an illustrative, non-exclusive example of a fuselage barrel that includes a composite structure that may be formed using the systems and methods according to the present disclosure.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
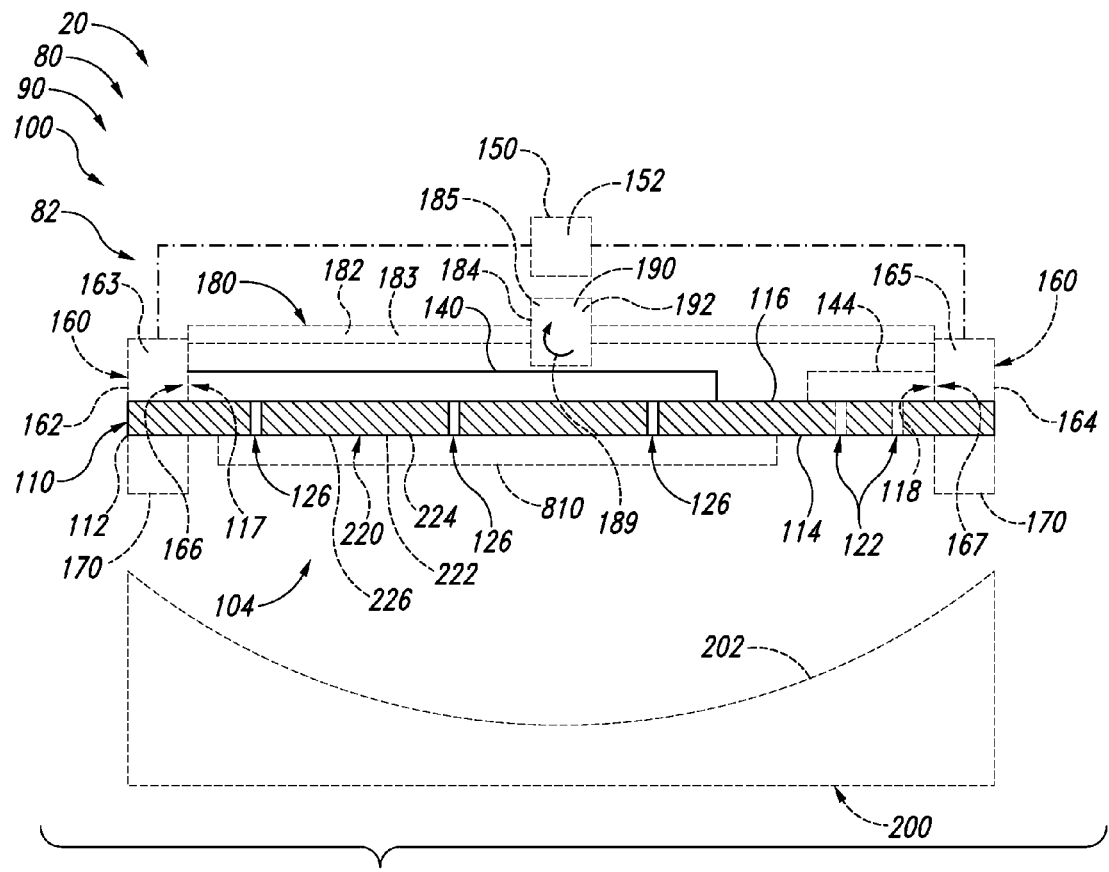
FIG. 3 is a schematic representation of illustrative, non-exclusive examples of a flexible material transfer device according to the present disclosure.

FIG. 3 is a schematic representation of illustrative, non-exclusive examples of a flexible material transfer device 100 according to the present disclosure that may form a portion of and/or be included in a composite structure fabrication assembly 20, a rotating material transfer assembly 80, and/or a flexible vacuum compaction device 90 according to the present disclosure. Illustrative, non-exclusive examples of composite structure fabrication assemblies 20 that may include and/or utilize rotating material transfer assembly 80, flexible vacuum compaction device 90, and/or flexible material transfer device 100 are disclosed in U.S. patent application Ser. No. 13/693,887, which was filed on Dec. 4, 2012, and the complete disclosure of which is hereby incorporated by reference.

Figure 7:
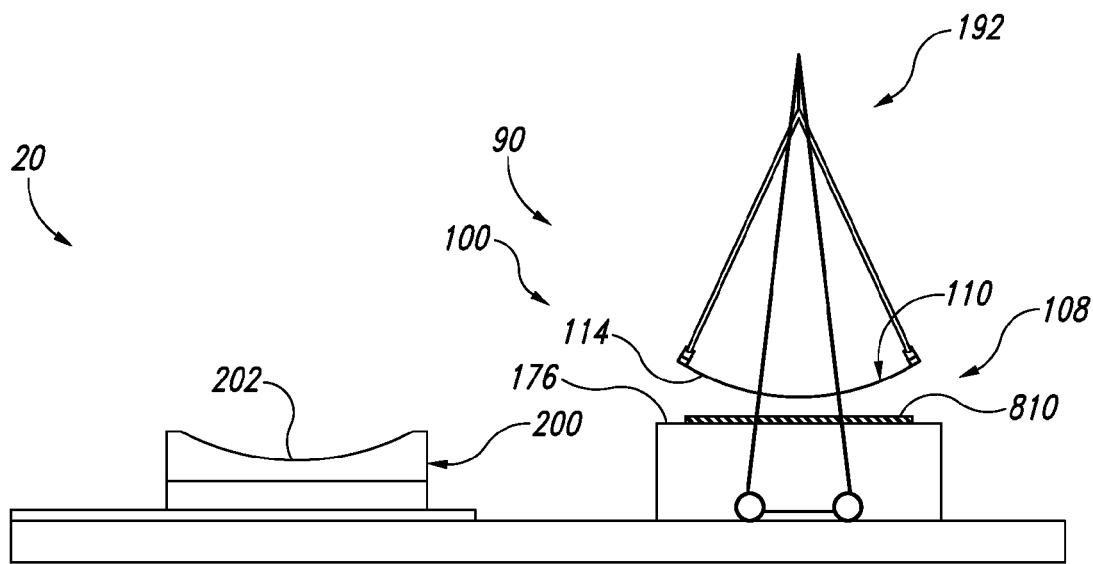
FIG. 7 is a schematic representation of an illustrative, non-exclusive example of a first process flow according to the present disclosure that may be utilized to define a composite structure.

As discussed in more detail herein, flexible material transfer device 100 may be configured to selectively and operatively attach to a charge of composite material 810 to permit and/or facilitate transfer, or translation, of charge of composite material 810. Flexible material transfer device 100, which also may be referred to herein as device 100 and/or as material transfer device 100, includes a flexible substrate 110 and a retention manifold 140. Material transfer device 100 and/or flexible substrate 110 thereof defines a material contacting surface 114, which is configured to contact charge of composite material 810, and also may define a back surface 116, which may be opposed to material contacting surface 114. Flexible substrate 110 is selected or configured to selectively and repeatedly transition between a stowed conformation 104 (as illustrated in FIG. 3), in which the flexible substrate may be planar, or at least substantially planar, and a deployed conformation 108 (as illustrated in FIG. 7), in which the flexible substrate may not be planar.

In addition, flexible substrate 110 defines a plurality of retention conduits 126 that is at least partially defined by material contacting surface 114, and retention manifold 140 may be constructed and/or configured to provide fluid communication between retention conduits 126 and a vacuum source 150 to selectively generate a retention vacuum within retention conduits 126. When the retention vacuum is applied to retention conduits 126 and charge of composite material 810 is received on material contacting surface 114, device 100 may be configured to retain charge of composite material 810 on material contacting surface 114 (such as via a pressure force that may be generated across charge of composite material 810 due to the application of the retention vacuum to retention conduits 126. Conversely, and when the retention vacuum is not applied to retention conduits 126 (or when a pressurized gas is applied to retention conduits 126), device 100 may not be configured to retain charge of composite material 810 on material contacting surface 114 and/or may be configured to release charge of composite material 810 from material contacting surface 114.

As illustrated in dashed lines in FIG. 3, device 100 also may include an intermediate material 220 that may be located between at least a portion of device 100 and/or flexible substrate 110 thereof and charge of composite material 810. Intermediate material 220, when present, may include one or more perforations that may permit transfer of the evacuation vacuum and/or of the retention vacuum therethrough. Illustrative, non-exclusive examples of intermediate material 220 include a friction-modifying material 222 (which may be selected to modify a coefficient of friction between flexible substrate 110 and charge of composite material 810), an adhesion-modifying material 224 (which may be selected to modify an adhesive force between flexible substrate 110 and charge of composite material 810), and/or an inert material 226 (which may be selected to prevent contamination of charge of composite material 810 by flexible material transfer device 100).

As also illustrated in dashed lines in FIG. 3, device 100 also may include a suspension structure 160 that may be operatively attached to any suitable portion of device 100, such as to flexible substrate 110 and/or to back surface 116 thereof. As discussed in more detail herein, suspension structure 160 may be utilized as a lift and/or suspension point to lift, suspend, move, and/or otherwise translate device 100.

Flexible vacuum compaction device 90 may include flexible material transfer device 100 and, as discussed in more detail herein, may be configured to compact charge of composite material 810 on a supporting surface 202 of a layup mandrel 200. The vacuum compaction may include operatively positioning the flexible vacuum compaction device relative to supporting surface 202 to define an enclosed volume that also includes, or contains, charge of composite material 810 and decreasing the pressure within the enclosed volume to vacuum compact charge of composite material 810. Illustrative, non-exclusive examples of vacuum compaction devices, as well as components thereof, are disclosed in U.S. patent application Ser. No. 13/769,022, which was filed on Feb. 15, 2013, and the complete disclosure of which is hereby incorporated by reference.

As illustrated in dashed lines in FIG. 3, flexible vacuum compaction device 90, which also may be referred to herein as device 90, may include a plurality of evacuation conduits 122 that are at least partially defined by flexible substrate 110 and/or by material contacting surface 114 thereof. Device 90 further includes a sealing structure 170 that is configured to form a fluid seal between supporting surface 202 and flexible substrate 110 when device 90 is located on supporting surface 202 and sealing structure 170 is compressed between supporting surface 202 and flexible substrate 110. Device 90 also includes an evacuation manifold 144 that provides fluid communication between evacuation conduits 122 and vacuum source 150 (or another vacuum source 150 that may be independent from vacuum source 150 that is utilized to apply the retention vacuum to retention conduits 126). Thus, vacuum source 150 may be configured to selectively apply an evacuation vacuum to evacuation conduits 122 and/or to the enclosed volume that may be in fluid communication therewith.

Rotating material transfer assembly 80 includes a vacuum chuck 82 that may include and/or be defined by vacuum compaction device 90 and/or by flexible material transfer device 100. As discussed in more detail herein, rotating material transfer assembly 80 may be configured to selectively transition vacuum chuck 82 between a loading orientation, in which vacuum chuck 82 is oriented to receive charge of composite material 810 on material contacting surface 114, and an application orientation, in which vacuum chuck 82 is oriented to locate charge of composite material 810 on supporting surface 202.

As illustrated in dashed lines in FIG. 3, rotating material transfer assembly 80 may include a conformation regulating structure 180 that is configured to regulate, or control, a surface contour of flexible substrate 110 (or material contacting surface 114 thereof). This may include regulating the transition of flexible substrate 110 between stowed conformation 104 and deployed conformation 108 and/or regulating a shape of the surface contour when flexible substrate 110 is in stowed conformation 104 and/or in deployed conformation 108. As also illustrated in dashed lines in FIG. 3, rotating material transfer assembly 80 also may include an orientation regulating mechanism 184 that is configured to selectively transition vacuum chuck 82 between the loading orientation and the application orientation.

In addition, rotating material transfer assembly 80 (or conformation regulating structure 180 thereof) also may include a beam 190, which also may be referred to herein as a rigid, or at least substantially rigid, beam 190 and/or as a central support beam 190. Beam 190 may be operatively attached to and/or may form a portion of conformation regulating structure 180. It is within the scope of the present disclosure that beam 190 and/or conformation regulating structure 180 may be tubular structures that may define an internal, or enclosed, volume. In addition, it is also within the scope of the present disclosure that this internal, or enclosed, volume may be in fluid communication with first internal volume 163 and/or second internal volume 165 of suspension structure 160. As such, beam 190 and/or conformation regulating structure 180 may form and/or define a portion of retention manifold 140 and/or evacuation manifold 144. As also illustrated in dashed lines in FIG. 3, rotating material transfer assembly 80 also may include and/or be operatively attached to a translation mechanism 192 that is configured to translate vacuum chuck 82 relative to supporting surface 202.

Flexible substrate 110 may include any suitable structure that may define at least material contacting surface 114 and retention conduits 126 and may be formed from and/or include any suitable material. As illustrative, non-exclusive examples, flexible substrate 110 may be formed from and/or may include a flexible material and/or a resilient material. As additional illustrative, non-exclusive examples, flexible substrate 110 may be formed from a polymeric material, a polycarbonate material, a plastic, a polyester, a metal, and/or aluminum.

As discussed, flexible substrate 110 is selected and/or configured to repeatedly transition between stowed conformation 104 and deployed conformation 108. In addition, and as also discussed, stowed conformation 104 may define a planar, or at least substantially planar, conformation for flexible substrate 110 and/or for material contacting surface 114 and/or back surface 116 thereof.

In contrast, deployed conformation 108 defines a non-planar, curved, and/or arcuate conformation for flexible substrate 110 and/or for material contacting surface 114 and/or back surface 116 thereof (as illustrated in FIG. 7). Thus, flexible substrate 110 will stretch, compress, and/or deform when transitioning between stowed conformation 104 and deployed conformation 108. Stowed conformation 104 also may be referred to herein as planar conformation 104 and/or as undeformed conformation 104, and deployed conformation 108 also may be referred to herein as non-planar conformation 108 and/or as deformed conformation 108.

As discussed in more detail herein, charge of composite material 810 may be located on flexible substrate 110 when flexible substrate 110 is in stowed conformation 104. Under these conditions, flexible substrate 110 may be configured to retain charge of composite material 810 in tension at least in a direction that is parallel to material contacting surface 114 during and/or subsequent to transitioning from stowed conformation 104 to deployed conformation 108. This tension may permit, or facilitate, deformation of charge of composite material 810 without damage to and/or wrinkling of charge of composite material 810, thereby decreasing a potential for defects within a composite structure that may be formed from charge of composite material 810.

In order to maintain charge of composite material 810 in tension during the transition from stowed conformation 104 to deployed conformation 108, material contacting surface 114 may define a convex surface contour when flexible substrate 110 is in deployed conformation 108. Additionally or alternatively, a radius of curvature that is defined by back surface 116 may be less than a radius of curvature that is defined by material contacting surface 114, which may be less than or equal to a radius of curvature that may be defined by charge of composite material 810 when flexible substrate 110 is in deployed conformation 108 and charge of composite material 810 is located thereon. Furthermore, and as also discussed in more detail herein, the radius of curvature that is defined by charge of composite material 810 may be less than a radius of curvature that is defined by supporting surface 202 when flexible substrate 110 is in deployed conformation 108 and charge of composite material 810 is located thereon. This may permit subsequent location of charge of composite material 810 on supporting surface 202 without wrinkling of charge of composite material 810.

Figure 4:
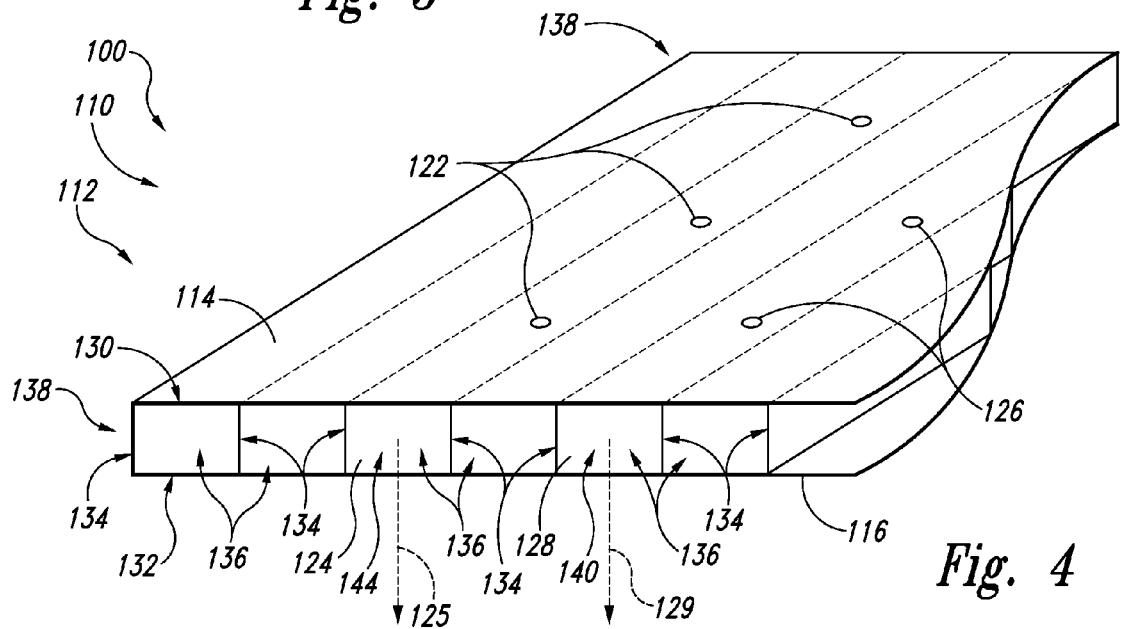
FIG. 4 is a schematic representation of illustrative, non-exclusive examples of a flexible substrate that may be utilized with the systems and methods according to the present disclosure.

It is within the scope of the present disclosure that retention manifold 140 and/or evacuation manifold 144 may be separate and/or distinct from flexible substrate 110. Additionally or alternatively, it is also within the scope of the present disclosure that at least a portion of retention manifold 140 and/or of evacuation manifold 144 may be defined by and/or may be located within flexible substrate 110. With this in mind, FIG. 4 is a schematic representation of illustrative, non-exclusive examples of a flexible substrate 110 that may be utilized with the systems and methods according to the present disclosure. Flexible substrate 110 of FIG. 4 may be utilized with any of the flexible material transfer devices 100 that are disclosed herein with reference to any of FIG. 3 or 5-23.

Flexible substrate 110 of FIG. 4 includes a first wall 130, a second, opposed wall 132, and a plurality of elongate webs 134 that extend between first wall 130 and second wall 132. Such a flexible substrate 110 also may be referred to herein as a panel 112 and/or a double-walled panel 112. Walls 130 and 132, together with the plurality of elongate webs 134, define a plurality of elongate channels 136 that extend within flexible substrate 110. As illustrated, channels 136 may extend along a longitudinal axis that is parallel to first wall 130 and/or second wall 132, may extend from an edge 138 of flexible substrate 110, may extend from a first edge of flexible substrate 110 to a second edge of flexible substrate 110, and/or may extend between two opposed edges of flexible substrate 110.

First wall 130 may define material contacting surface 114 of flexible substrate 110, and second wall 132 may define back surface 116 of flexible substrate 110. In addition, first wall 130 also may define at least a portion of evacuation conduits 122 and/or retention conduits 126, as shown.

Retention conduits 126 may be in fluid communication with one or more selected elongate channels 136, which also may be referred to herein as retention channels 128 and may form a portion of retention manifold 140. Thus, and as illustrated by a dashed arrow at 129 in FIG. 4, vacuum source 150 may selectively evacuate (or provide the retention vacuum to) retention channels 128. When charge 810 of composite material is located on material contacting surface 114 of flexible substrate 110, this vacuum may be utilized to retain charge 810 of composite material on material contacting surface 114 of flexible substrate 110, as discussed herein.

Additionally or alternatively, evacuation conduits 122 may be in fluid communication with one or more selected elongate channels 136, which also may be referred to herein as evacuation channels 124 and may form a portion of evacuation manifold 144. Thus, and as illustrated by a dashed arrow at 125 in FIG. 4, vacuum source 150 may selectively evacuate (or provide the evacuation vacuum to) evacuation channels 124. When flexible substrate 110 of FIG. 4 forms a portion of vacuum chuck 82 and is positioned on supporting surface 202, this vacuum may be utilized to decrease the pressure within the enclosed volume and/or compact charge of composite material 810, as discussed herein.

Returning to FIG. 1, it is within the scope of the present disclosure that material contacting surface 114 of flexible substrate 110 may be sized, selected, and/or configured to support large, or relatively large, charges of composite material 810. Additionally or alternatively, it is within the scope of the present disclosure that flexible material transfer device 100 may be configured to transfer and/or that flexible vacuum compaction device 90 may be configured to compact large charges of composite material 810. Thus, material contacting surface 114 may define at least a threshold surface area. As illustrative, non-exclusive examples, the surface area of material contacting surface 114 may be at least 1 square meter, at least 2 square meters, at least 3 square meters, at least 4 square meters, at least 6 square meters, at least 8 square meters, at least 10 square meters, at least 12 square meters, at least 15 square meters, or at least 20 square meters. As additional illustrative, non-exclusive examples, the surface area of material contacting surface 114 may be fewer than 50 square meters, fewer than 45 square meters, fewer than 40 square meters, fewer than 35 square meters, fewer than 30 square meters, fewer than 25 square meters, or fewer than 20 square meters.

Suspension structure 160 may include any suitable structure that may be operatively attached to device 100 and that may be utilized as a lift and/or suspension point to lift, suspend, move, and/or otherwise translate device 100. As an illustrative, non-exclusive example, and as illustrated in FIG. 3, suspension structure 160 may include and/or be a first suspension member 162 that is operatively attached to a first side of flexible substrate 110 (or to a first side of back surface 116) and a second suspension member 164 that is operatively attached to a second side of flexible substrate 110 (or to a second side of back surface 116). As also illustrated in FIG. 3, first suspension member 162 may be spaced apart from and/or opposed to second suspension member 164 (or the first side of flexible substrate 110 may be spaced apart from and/or opposed to the second side of flexible substrate 110).

When flexible substrate 110 includes panel 112, it is within the scope of the present disclosure that first suspension member 162 and/or second suspension member 164 may define any suitable orientation, or relative orientation, with respect to elongate channels 136 (as illustrated in FIG. 4). As an illustrative, non-exclusive example, first suspension member 162 may define a first suspension member longitudinal direction, second suspension member 164 may define a second suspension member longitudinal direction, elongate channels 136 may define an elongate channel longitudinal direction, and the elongate channel longitudinal direction may be perpendicular to the first suspension member longitudinal direction and/or to the second suspension member longitudinal direction. This may permit first suspension member 162 and/or second suspension member 164 to form a portion of retention manifold 140 and/or evacuation manifold 144.

As an illustrative, non-exclusive example, suspension structure 160 (or first suspension member 162 and/or second suspension member 164 thereof) may be a tubular suspension structure that defines an internal volume, such as first internal volume 163 and/or second internal volume 165 respectively. As an illustrative, non-exclusive example, first suspension member 162 may form a portion of retention manifold 140. Under these conditions, first suspension member 162 may define a suspension structure retention opening 166 and retention manifold 140 (and/or back surface 116 of flexible substrate 110 when retention manifold 140 is defined by flexible substrate 110) may define a back surface retention opening 117 that is aligned with suspension structure retention opening 166 to permit fluid communication between internal volume 163 and retention conduits 126.

As another illustrative, non-exclusive example, second suspension member 164 may form a portion of evacuation manifold 144. Under these conditions, second suspension member 164 may define a suspension structure evacuation opening 167 and evacuation manifold 144 (and/or back surface 116 of flexible substrate 110 when evacuation manifold 144 is defined by flexible substrate 110) may define a back surface evacuation opening 118 that is aligned with suspension structure evacuation opening 167 to permit fluid communication between internal volume 165 and evacuation conduits 122.

It is within the scope of the present disclosure that suspension structure 160 (or first suspension member 162 and/or second suspension member 164 thereof) may include any suitable material properties and/or may be defined by any suitable material. As an illustrative, non-exclusive example, suspension structure 160 may include and/or be a rigid, or at least substantially rigid, suspension structure 160. As another illustrative, non-exclusive example, suspension structure 160 may include and/or be a metallic suspension structure.

Conformation regulating structure 180 may include any suitable structure that is selected, sized, designed, and/or configured to regulate the surface contour of material contacting surface 114. As an illustrative, non-exclusive example, and as illustrated in FIG. 3, conformation regulating structure 180 may be operatively attached to suspension structure 160, such as to control relative motion of first suspension member 162 relative to (or with respect to) second suspension member 164.

As another illustrative, non-exclusive example, and as illustrated in FIGS. 3, 13-14, and 16-22, conformation regulating structure 180 and/or suspension structure 160 may include and/or be operatively attached to an attachment point 182 that permits motion of conformation regulating structure 180 relative to suspension structure 160 when flexible substrate 110 transitions between stowed conformation 104 and deployed conformation 108. Attachment point 182 may include and/or be a pivot point 182 that permits rotation of suspension structure 160 relative to conformation regulating structure 180 and/or a slot 182 that permits translation of suspension structure 160 relative to conformation regulating structure 180.

As yet another illustrative, non-exclusive example, conformation regulating structure 180 may include and/or be operatively attached to an actuator 183 that is configured to selectively regulate the transition between stowed conformation 104 and deployed conformation 108 (such as by selectively regulating the relative motion of conformation regulating structure 180 with respect to suspension structure 160). Illustrative, non-exclusive examples of actuators 183 include any suitable mechanical actuator, hydraulic actuator, electronic actuator, and/or pneumatic actuator.

It is within the scope of the present disclosure that conformation regulating structure 180 may define any suitable orientation relative to suspension structure 160. As an illustrative, non-exclusive example, conformation regulating structure 180 may define a conformation regulating structure longitudinal axis that may be perpendicular, or at least substantially perpendicular, to a suspension structure longitudinal axis (such as the longitudinal axis of first suspension member 162 and/or of second suspension member 164). It is also within the scope of the present disclosure that conformation regulating structure 180 may be defined by any suitable beam, at least substantially rigid beam, and/or rigid beam.

Beam 190 may include any suitable structure, such as a rigid beam 190, and/or an at least substantially rigid beam 190, that may be operatively attached to conformation regulating structure 180 and may be oriented at any suitable orientation relative to conformation regulating structure 180. As an illustrative, non-exclusive example, a longitudinal axis of beam 190 may be perpendicular, or at least substantially perpendicular, to the longitudinal axis of conformation regulating structure 180. As another illustrative, non-exclusive example, beam 190 may be located to contact and/or support back surface 116 of flexible substrate 110 when flexible substrate 110 is in stowed conformation 104.

As discussed in more detail herein, orientation regulating mechanism 184 may include a pivot 185 that is operatively attached to beam 190 and that is configured to permit rotation of flexible substrate 110 about a rotational axis 189 to permit transitioning between the loading orientation and the application orientation. To facilitate rotation thereof, beam 190 and/or pivot 185 may be located such that the rotational axis passes through, or near, a center of mass of rotating material transfer assembly 80. In addition, and as discussed herein, beam 190 may form a portion of retention manifold 140 and/or of evacuation manifold 144. As such the retention vacuum and/or the evacuation vacuum may be conveyed to retention manifold 140 and/or evacuation manifold 144, respectively, through pivot 185, thereby decreasing a complexity of the manifolds and/or thereby permitting continuous rotation of rotating material transfer assembly 80 about rotational axis 189.

Charge of composite material 810 may include any suitable structure that is defined by at least one composite ply. As illustrative, non-exclusive examples, charge of composite material 810 may include at least 2, at least 3, at least 4, at least 5, at least 6, at least 8, or at least 10 stacked composite plies. Additionally or alternatively, charge of composite material 810 may include fewer than 20, fewer than 15, fewer than 10, fewer than 8, fewer than 6, fewer than 5, fewer than 4, or fewer than 3 stacked composite plies.

Similarly, charge of composite material 810 may be formed and/or defined from any suitable composite material, component of the composite material, and/or component of composite structure 800. As illustrative, non-exclusive examples, charge 810 may include and/or be a plurality of fibers, a cloth, a plurality of fibers embedded in a resin material, a cloth embedded in a resin material, a layer and/or film of resin material and/or of adhesive, a stiffening layer and/or material, a core layer and/or material, a honeycomb structure, a foam, and/or a syntactic foam. As more specific but still illustrative, non-exclusive examples, charge of composite material 810 may include and/or be a pre-impregnated composite material and/or a pre-impregnated composite tape. As yet another illustrative, non-exclusive example, charge of composite material 810 also may include and/or be a viscoelastic material. Illustrative, non-exclusive examples of the plurality of fibers include a plurality of carbon fibers, a plurality of polymeric fibers, and/or a plurality of glass fibers. Illustrative, non-exclusive examples of the cloth include a cloth that is formed from the plurality of fibers. Illustrative, non-exclusive examples of the resin material include an epoxy, an adhesive, and/or a polymeric resin. Additionally or alternatively, it is also within the scope of the present disclosure that the systems and methods disclosed herein may be utilized with, or to transfer, other materials that are not generally considered composite materials.

Sealing structure 170 may include any suitable structure that may form the fluid seal between flexible substrate 110 and supporting surface 202 when flexible vacuum compaction device 90 is positioned on supporting surface 202. As illustrative, non-exclusive examples, sealing structure 170 may include and/or be a compression seal, a resilient seal, and/or a tubular resilient seal that may be formed from any suitable material, illustrative, non-exclusive examples of which include a resilient material, a polymeric material, latex, and/or urethane. This may include materials that do not adhere to, chemically react with, and/or transfer a contaminant to supporting surface 202.

Vacuum source 150 may include any suitable structure that may be configured to generate and/or provide the retention vacuum to retention conduits 126 and/or to generate and/or provide the evacuation vacuum to evacuation conduits 122. As an illustrative, non-exclusive example, vacuum source 150 may include and/or be a vacuum pump. It is within the scope of the present disclosure that a single vacuum source 150 may generate both the retention vacuum and the evacuation vacuum. However, it is also within the scope of the present disclosure that separate, or dedicated, vacuum sources 150 may be utilized to generate, or independently generate, the retention vacuum and the evacuation vacuum.

Regardless of the specific configuration of vacuum source 150, vacuum source 150 further may include and/or be in fluid communication with a vacuum control assembly 152 that is configured to selectively control application of the retention vacuum to retention conduits 126 and/or to selectively control application of the evacuation vacuum to evacuation conduits 122. Illustrative, non-exclusive examples of vacuum control assembly 152 include any suitable valve, flapper, and/or damper.

It is within the scope of the present disclosure that retention conduits 126 and/or evacuation conduits 122 may be arranged in a plurality of zones and/or regions across material contacting surface 114, and vacuum control assembly 152 may be configured to selectively control the application of the retention vacuum and/or of the evacuation vacuum to one or more selected, or target, zones of the plurality of zones while not applying the retention vacuum and/or the evacuation vacuum to one or more other zones of the plurality of zones.

As an illustrative, non-exclusive example, fabrication of composite structure 800 may include transferring and/or compacting a plurality of charges of composite material 810, and a shape of at least one of the plurality of charges of composite material 810 may be different than a shape of at least one other of the plurality of charges of composite material 810. Under these conditions, vacuum control assembly 152 may be utilized to selectively provide the retention vacuum to retention conduits 126 that are proximal to and/or in fluid contact with charge of composite material 810 and/or to not apply the retention vacuum to retention conduits 126 that are not proximal to and/or in fluid contact with charge of composite material 810. As another illustrative, non-exclusive example, vacuum control assembly 152 also may be configured to provide a different vacuum level, or magnitude, to one or more selected evacuation conduits 122 and/or retention conduits 126 when compared to one or more other evacuation conduits 122 and/or retention conduits 126.

It is within the scope of the present disclosure that supporting surface 202 may define any suitable shape and/or surface contour. As illustrative, non-exclusive examples, supporting surface 202 may define a two-dimensional surface contour or a three-dimensional surface contour. As additional illustrative, non-exclusive examples, supporting surface 202 may define a surface contour of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

FIG. 3 illustrates rotating material transfer assembly 80 as including a single flexible substrate 110 that forms a portion of a single flexible vacuum compaction device 90 and/or a single flexible material transfer device 100. However, rotating transfer assemblies 80 according to the present disclosure may include a plurality of flexible vacuum compaction devices 90 and/or a plurality of flexible material transfer devices 100, as discussed in more detail herein with reference to FIGS. 22-24.

FIGS. 5-24 provide additional, less schematic but still illustrative, non-exclusive examples of composite structure fabrication assemblies 20, of process flows that may utilize composite structure fabrication assemblies 20, of rotating transfer assemblies 80, of flexible vacuum compaction devices 90, of flexible material transfer devices 100, and/or of components thereof. As discussed, any of the structures and/or features that are disclosed herein with reference to one or more of FIGS. 3-24 may be utilized with any of the composite structure fabrication assemblies 20, rotating transfer assemblies 80, flexible vacuum compaction devices 90, and/or flexible material transfer devices 100 that are disclosed herein without departing from the scope of the present disclosure.

Figure 5:
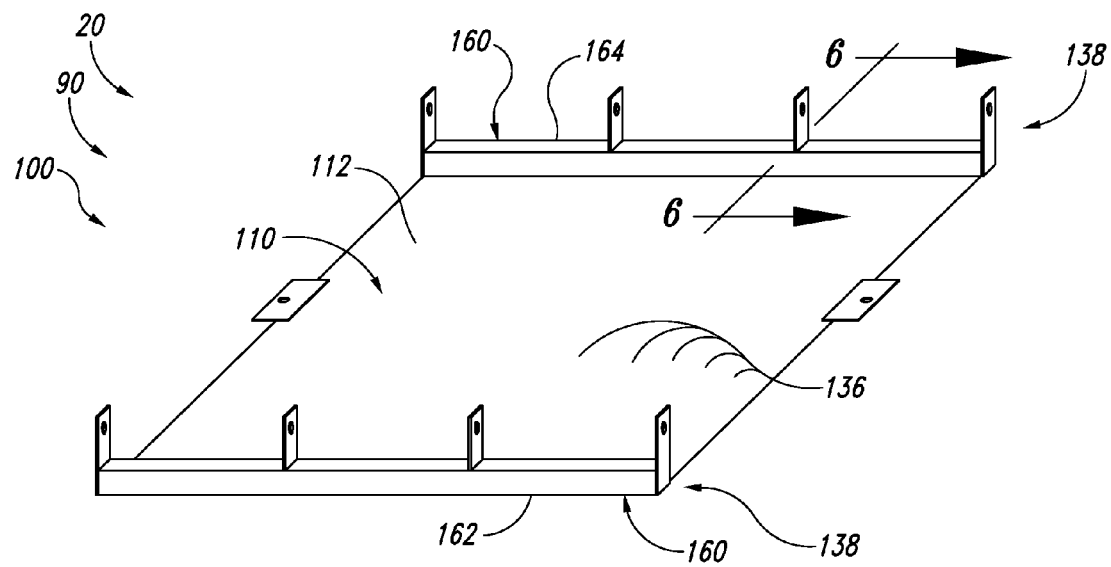
FIG. 5 is a less schematic but still illustrative, non-exclusive example of a flexible material transfer device according to the present disclosure that may form a portion of a flexible vacuum compaction device according to the present disclosure.
Figure 6:
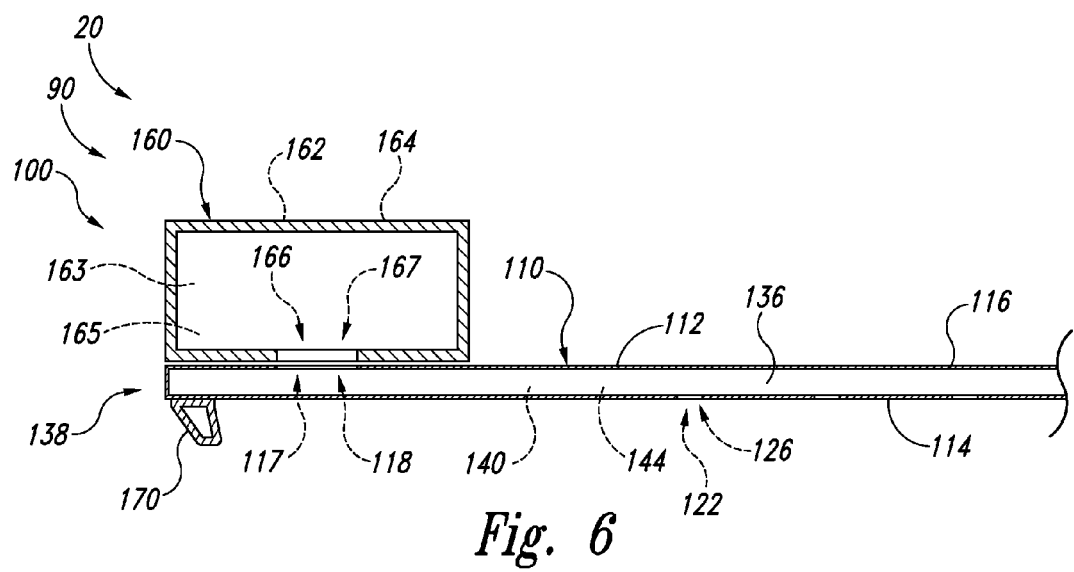
FIG. 6 is a schematic cross-sectional view of the flexible material transfer device of FIG. 5 taken along line 6-6.

FIG. 5 is a less schematic but still illustrative, non-exclusive example of a flexible material transfer device 100 according to the present disclosure that may form a portion of flexible vacuum compaction device 90 according to the present disclosure, while FIG. 6 is a schematic cross-sectional view of the flexible material transfer device of FIG. 5 taken along line 6-6. In the illustrative, non-exclusive example of FIGS. 5-6, flexible substrate 110 includes panel 112 that defines elongate channels 136 therein. Elongate channels 136 extend between edges 138 of panel 112. In addition, a suspension structure 160 in the form of first suspension member 162 and second suspension member 164 are operatively attached to panel 112 and extend along edges 138 thereof.

As illustrated in FIG. 6, panel 112 defines evacuation conduits 122 and/or retention conduits 126 that are in fluid communication with respective elongate channels 136. Elongate channels 136 provide fluid communication between conduits 122/126 and an internal volume 163/165 of suspension members 162/164 via aligned back surface retention openings 117 and suspension structure retention openings 166 and/or via aligned back surface evacuation openings 118 and suspension structure evacuation openings 167. Thus, evacuation conduits 122 may be in fluid communication with first internal volume 163 of first suspension member 162 via a first subset of the plurality of elongate channels 136, and retention conduits 126 may be in fluid communication with second internal volume 165 of second suspension member 164 via a second subset of the plurality of elongate channels 136.

This may permit application of the evacuation vacuum to evacuation conduits 122 via first suspension member 162, which forms a portion of evacuation manifold 144. Additionally or alternatively, this also may permit application of the retention vacuum to retention conduits 126 via second suspension member 164, which forms a portion of retention manifold 140. In addition, and when the first subset of the plurality of elongate channels 136 is fluidly isolated from the second subset of the plurality of elongate channels 136, the evacuation vacuum and the retention vacuum may be independently applied to evacuation conduits 122 and/or to retention conduits 126, respectively.

As also illustrated in FIG. 6, a sealing structure 170 may be operatively attached to material contacting surface 114 of panel 112. This may permit formation of an enclosed volume when sealing structure 170 is compressed between panel 112 and a supporting surface of a layup mandrel, as discussed herein.

Figure 8:
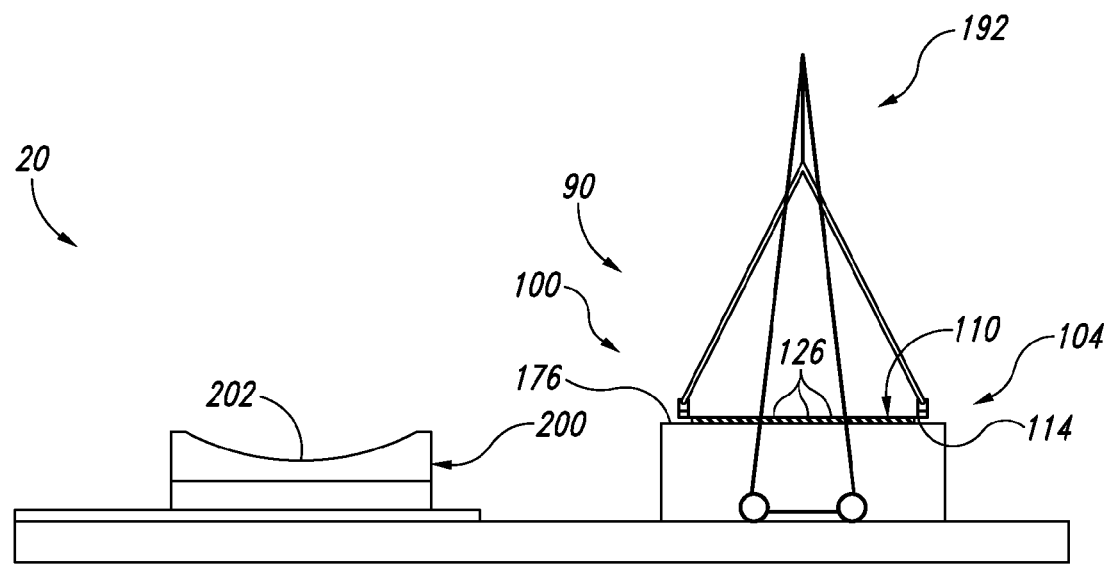
FIG. 8 is another schematic representation of the first process flow.

FIGS. 7-12 are schematic representations of an illustrative, non-exclusive example of a first process flow for a composite structure fabrication assembly 20 according to the present disclosure that may utilize flexible material transfer device 100 and/or flexible vacuum compaction device 90 of FIGS. 5-6 to define a composite structure. In FIG. 7, flexible substrate 110 is in a deployed conformation 108 and is located proximal to a charge of composite material 810, which has been placed and/or laid up on a planar layup surface 176. Then, and as illustrated in FIG. 8, a translation mechanism 192 may be utilized to lower flexible substrate 110 such that a material contacting surface 114 of flexible substrate 110 is in contact with charge of composite material 810. In addition, and as also illustrated in FIG. 8, flexible substrate 110 conforms to a shape, or surface contour, of planar layup surface 176, causing flexible substrate 110 to transition from deployed conformation 108 to stowed conformation 104.

Figure 9:
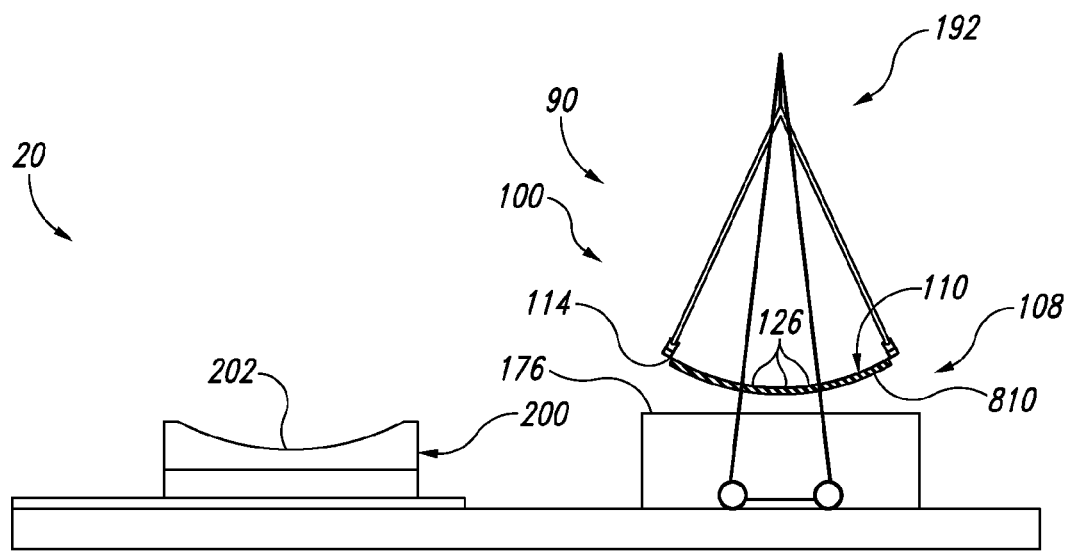
FIG. 9 is another schematic representation of the first process flow.
Figure 10:
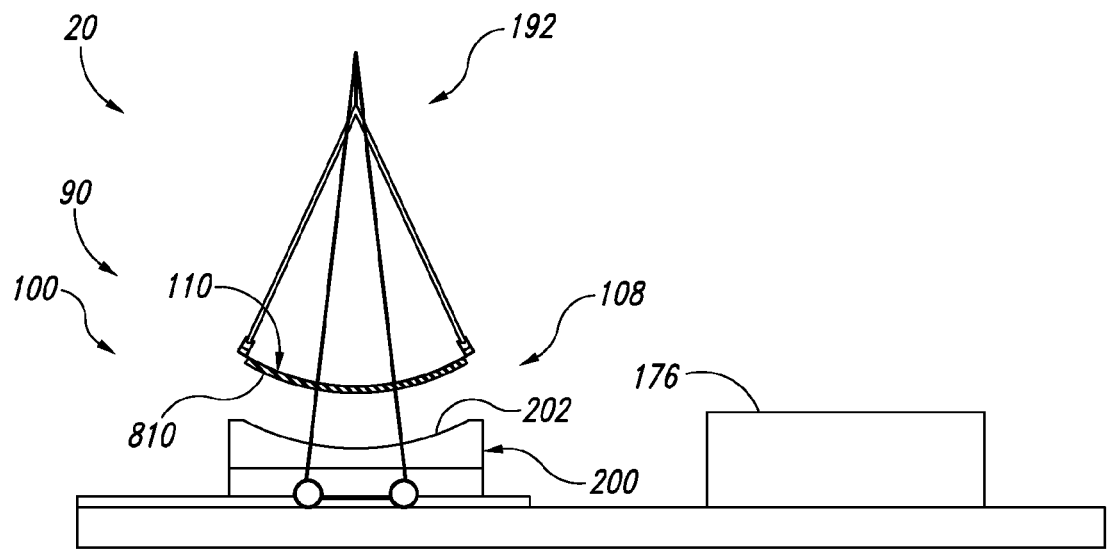
FIG. 10 is another schematic representation of the first process flow.

Subsequently, a vacuum may be applied to retention conduits 126 that are defined by flexible substrate 110 to operatively attach charge of composite material 810 to flexible substrate 110. Then, and as illustrated in FIG. 9, translation mechanism 192 may be utilized to lift charge of composite material 810 from planar layup surface 176. This may include deforming flexible substrate 110 to deployed conformation 108 and/or creating tension within charge of composite material 810 in a direction that is parallel to material contacting surface 114, as discussed herein.

Figure 11:
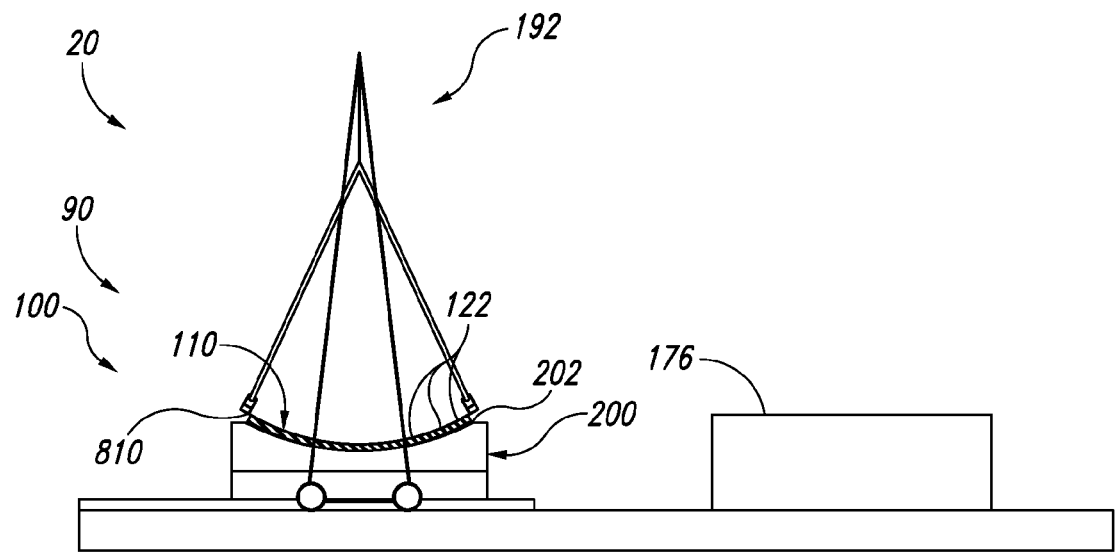
FIG. 11 is another schematic representation of the first process flow.

Translation mechanism 192 then may be utilized to locate charge of composite material 810 proximal to, near, and/or above a supporting surface 202 of a layup mandrel 200, as illustrated in FIG. 11; and translation mechanism 192 then may lower charge of composite material 810 onto supporting surface 202, as also illustrated in FIG. 11. As discussed herein, when charge of composite material 810 is operatively attached to flexible substrate 110 and flexible substrate 110 is in deployed conformation 108, charge of composite material 810 may define a radius of curvature that is less than a radius of curvature of supporting surface 202. Thus, charge of composite material 810 may be lowered onto and/or into contact with supporting surface 202 while maintaining the tension within charge of composite material 810, thereby preventing, or at least decreasing a potential for, wrinkling of charge of composite material 810 and/or of another charge of composite material that already may be located on supporting surface 202.

Figure 12:
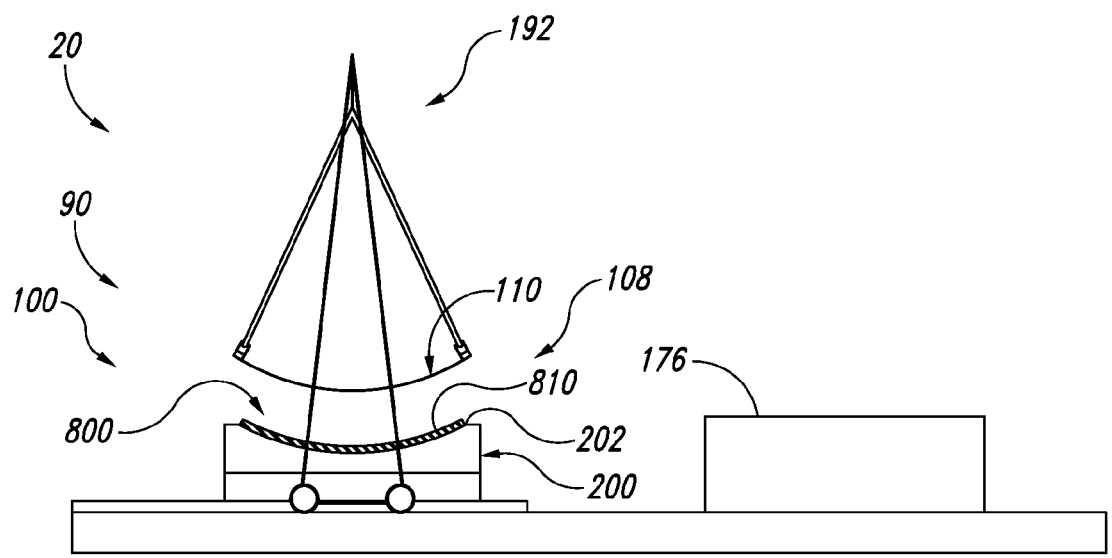
FIG. 12 is another schematic representation of the first process flow.

After charge of composite material 810 has been located on supporting surface 202, the retention vacuum may be released, ceased, and/or turned off, thereby releasing, or permitting separation of, charge of composite material 810 from material contacting surface 114. Additionally or alternatively, charge of composite material 810 may be vacuum compacted to supporting surface 202. This may include applying an evacuation vacuum to a plurality of evacuation conduits 122 that may be defined by flexible substrate 110, as discussed herein. Subsequently, and as illustrated in FIG. 12, translation mechanism 192 may be utilized to lift flexible substrate 110, thereby separating flexible substrate 110 from charge of composite material 810. As discussed herein, this process may be repeated any suitable number of times to locate and/or compact any suitable number of charges of composite material 810 on supporting surface 202 to thereby form a composite structure 800 (or at least a portion thereof).

Figure 13:
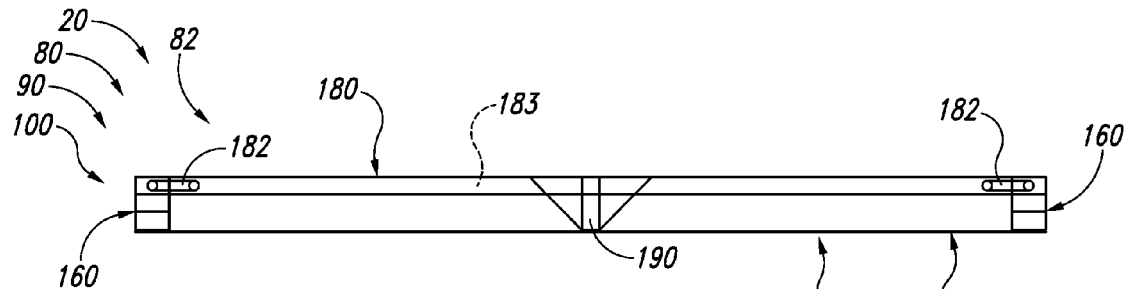
FIG. 13 is a less schematic representation of illustrative, non-exclusive examples of a rotating material transfer assembly according to the present disclosure in a stowed conformation.
Figure 14:
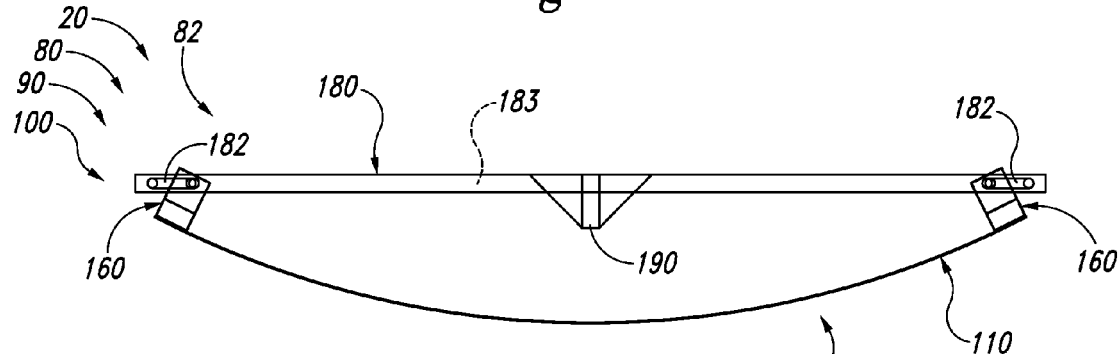
FIG. 14 is a schematic representation of illustrative, non-exclusive examples of the rotating material transfer assembly of FIG. 13 in a deployed conformation.
Figure 15:
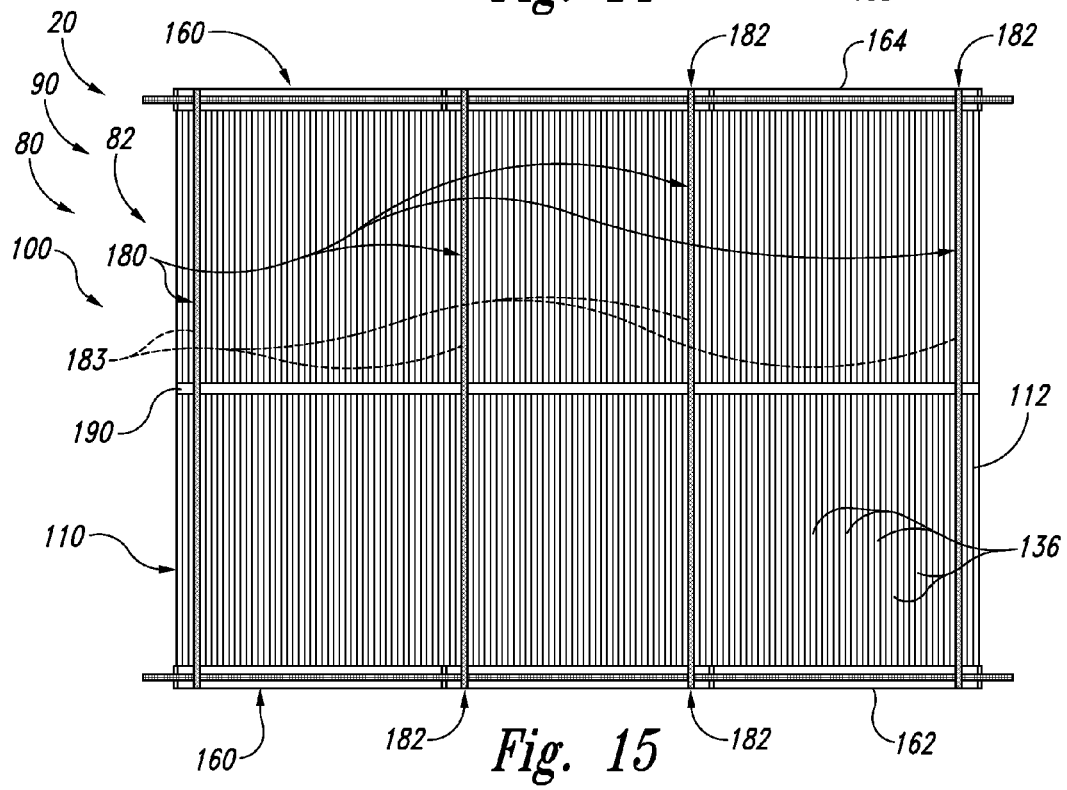
FIG. 15 is a schematic top view of the rotating material transfer assembly of FIGS. 13-14.

FIGS. 13-15 are less schematic representations of an illustrative, non-exclusive example of a rotating material transfer assembly 80 according to the present disclosure. Rotating material transfer assembly 80 includes a vacuum chuck 82, which also may be referred to herein as chuck 82, that may include and/or be flexible vacuum compaction device 90 and/or flexible material transfer device 100. As discussed in more detail herein with reference to FIGS. 16-22, rotating material transfer assembly 80 may form a portion of a composite structure fabrication assembly 20 according to the present disclosure. FIGS. 12-13 provide side views of rotation material transfer assembly 80, while FIG. 15 provides a top view of rotating material transfer assembly 80.

Rotating material transfer assembly 80 includes a flexible substrate 110 that is supported by and/or operatively attached to a suspension structure 160. Rotating material transfer assembly 80 also includes a beam 190 that may support and/or be in contact with a central portion of flexible substrate 110, as discussed in more detail herein with reference to FIGS. 16-22, and at least one conformation regulating structure 180. Conformation regulating structure 180 is operatively attached to suspension structure 160 via a plurality of attachment points 182 in the form of a plurality of slots 182. Slots 182 permit translation of suspension structure 160 relative to conformation regulating structure 180 when flexible substrate 110 transitions between a stowed configuration 104 (as illustrated in FIG. 13) and a deployed conformation 108 (as illustrated in FIG. 14).

As illustrated in dashed lines, rotating material transfer assembly 80 also may include an actuator 183 that is configured to selectively control the transition between stowed configuration 104 and deployed conformation 108. As illustrated in FIG. 15, it is within the scope of the present disclosure that flexible substrate 110 may include and/or be a panel 112 that defines a plurality of elongate channels 136 that extend between a first suspension member 162 and a second suspension member 164 of suspension structure 160. In addition, and as also illustrated in FIG. 15, rotating material transfer assembly 80 may include a plurality of conformation regulating structures 180 that may be spaced apart across a surface of flexible substrate 110, and the plurality of conformation regulating structures 180 may be associated with a plurality of actuators 183.

Figure 16:
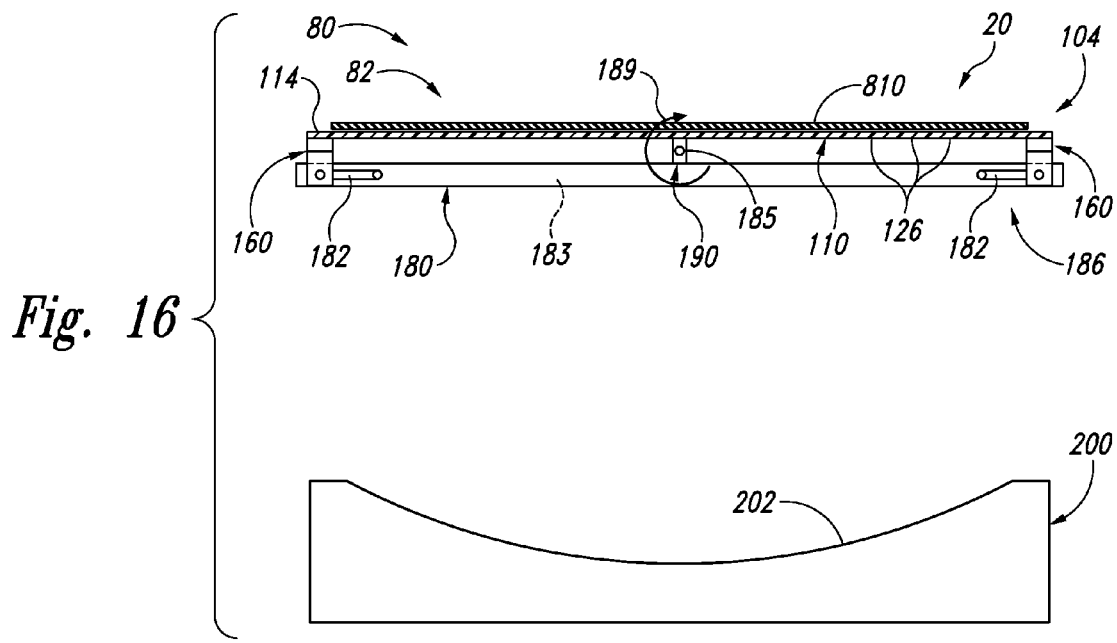
FIG. 16 is a schematic representation of an illustrative, non-exclusive example of a second process flow according to the present disclosure that may be utilized to define a composite structure.
Figure 17:
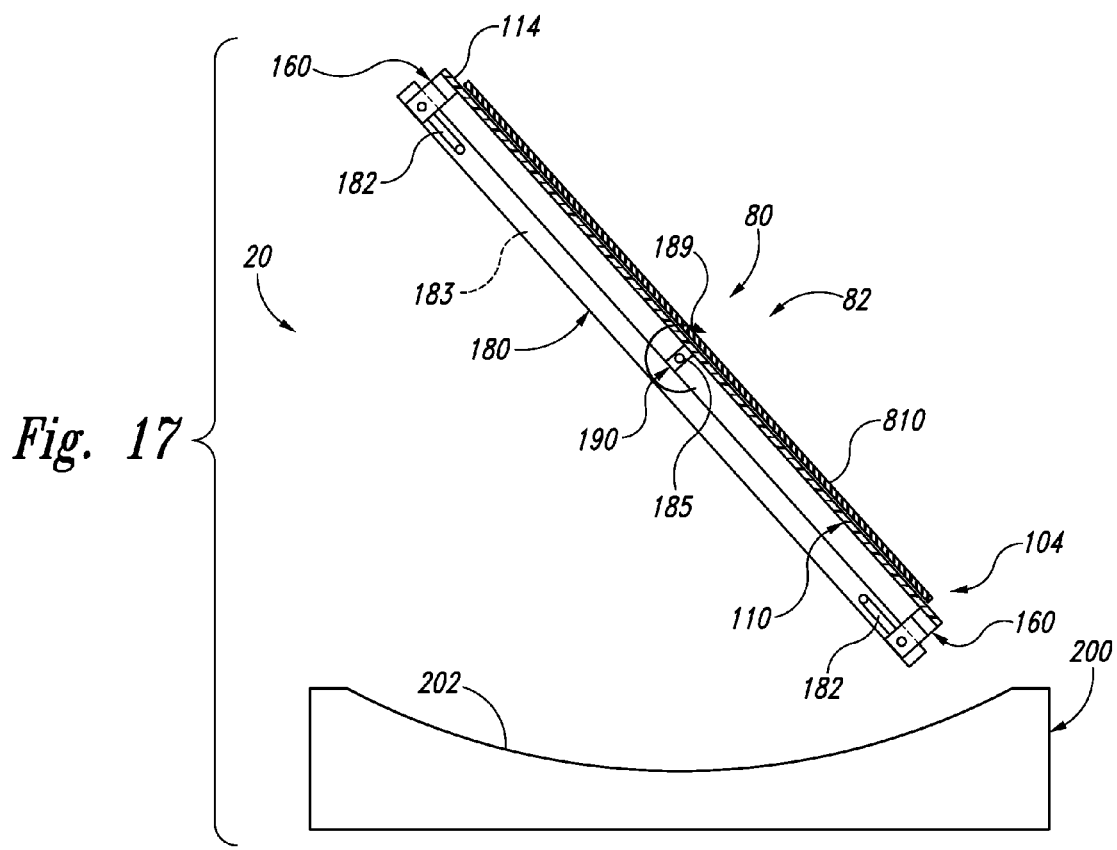
FIG. 17 is another schematic representation of the second process flow.

FIGS. 16-22 are schematic representations of an illustrative, non-exclusive example of a second process flow for a composite structure fabrication assembly 20 according to the present disclosure that may utilize rotating material transfer assembly 80 of FIGS. 13-15 to define a composite structure. As illustrated in FIGS. 16-22, rotating material transfer assembly 80 includes a beam 190 that has a pivot 185 attached thereto. As discussed herein, pivot 185 may permit rotation of a vacuum chuck 82 of rotating material transfer assembly 80 about a rotational axis 189, thereby permitting rotating material transfer assembly 80 (and/or chuck 82 thereof) to transition (as illustrated in FIG. 17) between a loading orientation 186 (as illustrated in FIG. 16) and an application orientation 188 (as illustrated in FIGS. 18-22).

It is within the scope of the present disclosure that loading orientation 186 and application orientation 188 may define any suitable orientation, or relative orientation, with respect to one another. As an illustrative, non-exclusive example, and as illustrated in FIGS. 16-22, loading orientation 186 may be opposed to, opposite of, at least substantially opposed to, and/or at least substantially opposite of application orientation 188. As another illustrative, non-exclusive example, and as also illustrated in FIGS. 16-22, a material contacting surface 114 that is defined by flexible substrate 110 may face in a vertical, or at least substantially vertical, direction when vacuum chuck 82 of rotating material transfer assembly 80 is in loading orientation 186 and/or in application orientation 188. As yet another illustrative, non-exclusive example, and as illustrated in FIG. 16, material contacting surface 114 may face away from, or at least substantially away from, may not face, and/or may not face toward a supporting surface 202 of a layup mandrel 200 when vacuum chuck 82 is in loading orientation 186. This may permit location of charge of composite material 810 on material contacting surface 114 without spatial constraints that might otherwise be present.

As another illustrative, non-exclusive example, and as illustrated in FIGS. 18-22, material contacting surface 114 may face and/or may face toward supporting surface 202 when vacuum chuck 82 is in application orientation 188. As discussed herein, this may permit rotating material transfer assembly 80 to locate charge of composite material 810 on supporting surface 202.

Figure 18:
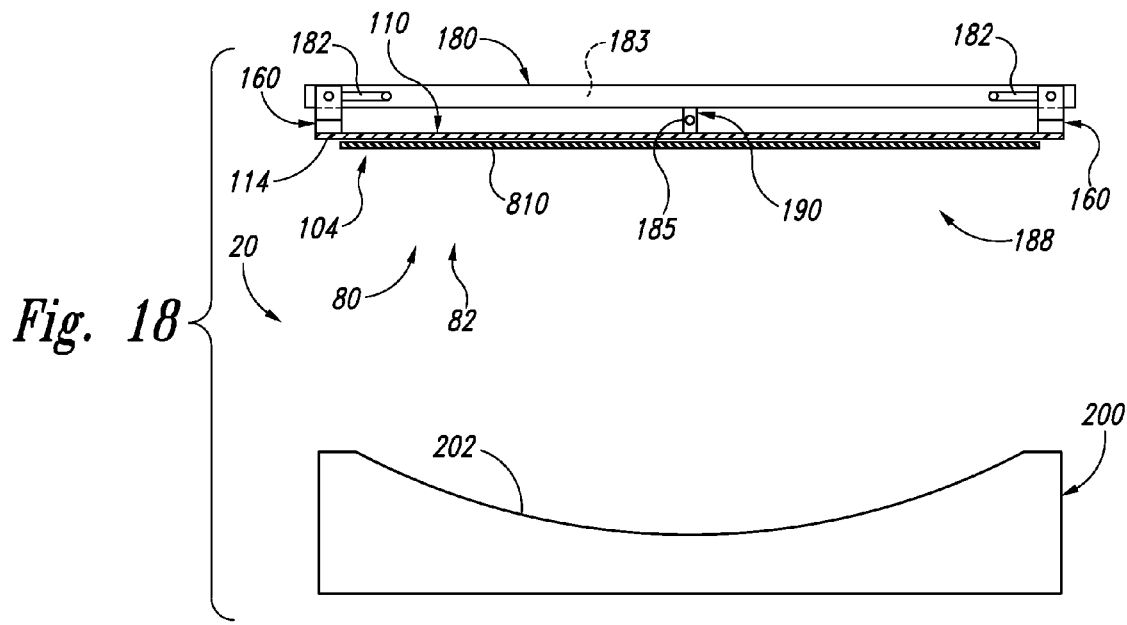
FIG. 18 is another schematic representation of the second process flow.

In FIG. 16, rotating material transfer assembly 80 is in a loading orientation 186 and flexible substrate 110 is in stowed conformation 104. Flexible substrate 110 has charge of composite material 810 received and/or located on material contacting surface 114 thereof and a retention vacuum may be applied to a plurality of retention conduits 126 that may be defined by flexible substrate 110. This may permit subsequent rotation of chuck 82 about rotational axis 189 to application orientation 188, as illustrated in FIGS. 17-18, without separation of charge of composite material 810 from material contacting surface 114.

Figure 19:
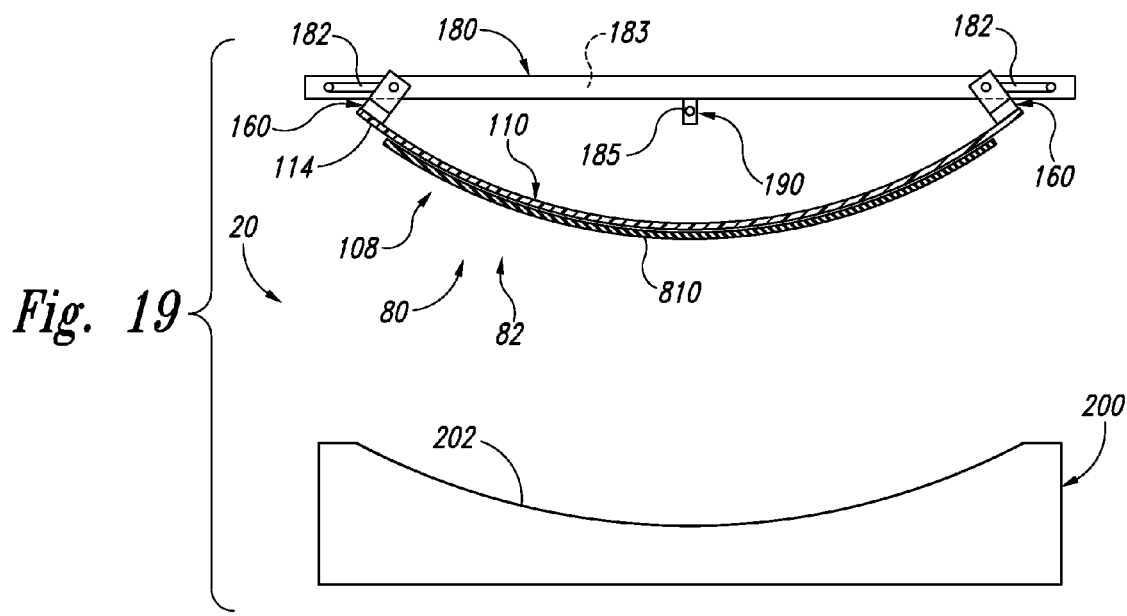
FIG. 19 is another schematic representation of the second process flow.

Subsequent to rotation to application orientation 188, flexible substrate 110 may be transitioned to deployed conformation 108, as illustrated in FIG. 19. As discussed herein, this may include deformation of flexible substrate 110, deformation of charge of composite material 810, and or tensioning charge of composite material 810 (or maintaining charge of composite material 810 in tension). Vacuum chuck 82 and layup mandrel 200 then may be moved toward one another using any suitable translation mechanism 192 such that charge of composite material 810 contacts supporting surface 202, as illustrated in FIG. 20.

Figure 20:
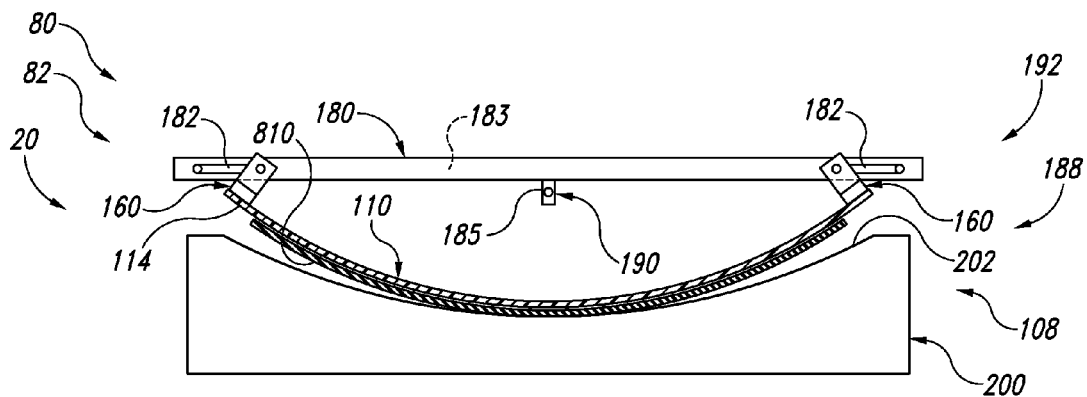
FIG. 20 is another schematic representation of the second process flow.
Figure 21:
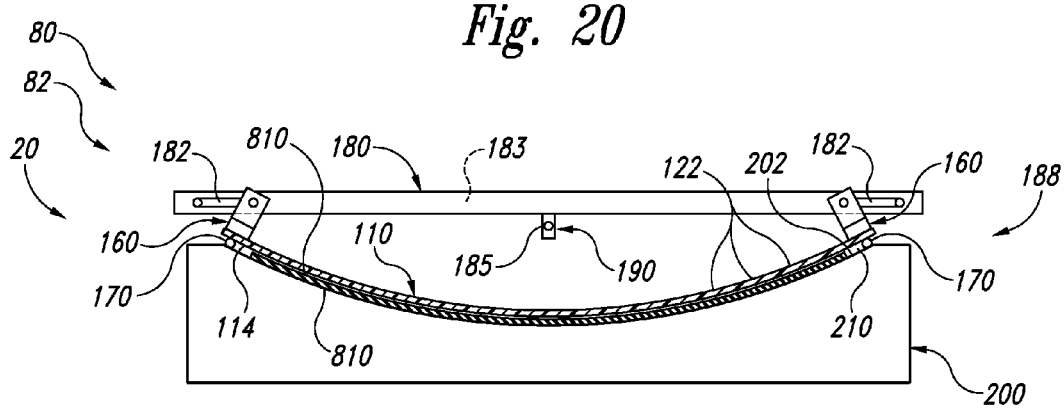
FIG. 21 is another schematic representation of the second process flow.

As also illustrated in FIG. 20 and discussed herein, when charge of composite material 810 is operatively attached to flexible substrate 110 and flexible substrate 110 is in deployed conformation 108, a radius of curvature of charge of composite material 810 may be less than a radius of curvature of supporting surface 202. This may permit composite structure fabrication assembly 20 to maintain charge of composite material 810 in tension as a surface contour, or shape, of charge of composite material 810 is conformed to a surface contour, or shape, of supporting surface 202, as illustrated in FIG. 21.

Figure 22:
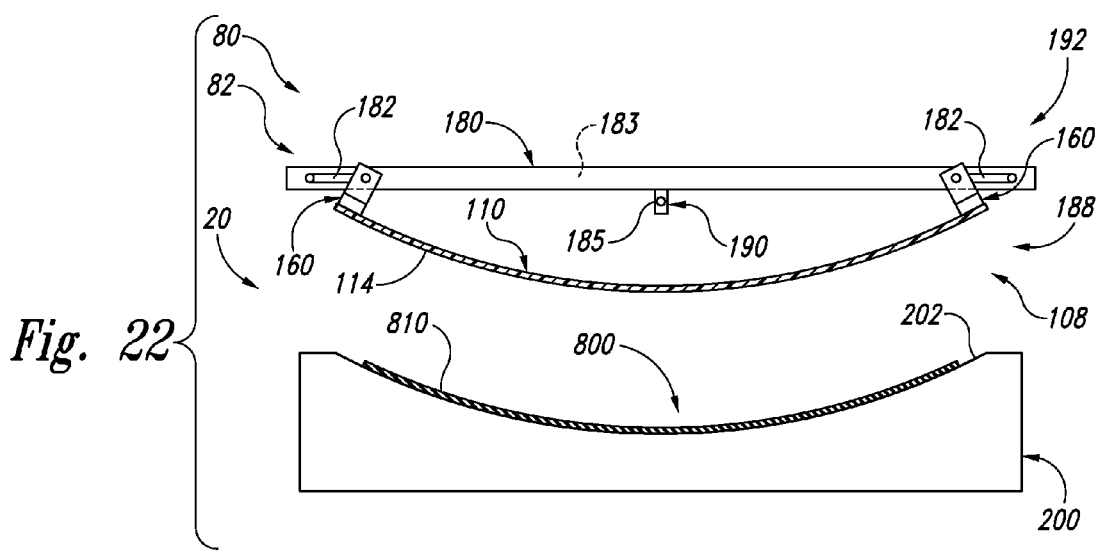
FIG. 22 is another schematic representation of the second process flow.

Subsequently, the retention vacuum may be released, thereby permitting separation of charge of composite material 810 from flexible substrate 110 using translation mechanism 192, as illustrated in FIG. 22. However, and prior to separation of flexible substrate 110 from charge of composite material 810, an evacuation vacuum may be applied to a plurality of evacuation conduits 122 that may be defined by flexible substrate 110 to evacuate an enclosed volume 210 (as illustrated in FIG. 21) that is defined by supporting structure 202, material contacting surface 114, and a sealing structure 170. This may permit compaction of charge of composite material 810 on supporting surface 202. This process may be repeated any suitable number of times to locate and/or compact any suitable number of charges of composite material 810 on supporting surface 202 to thereby form a composite structure 800 (or at least a portion thereof).

Figure 23:
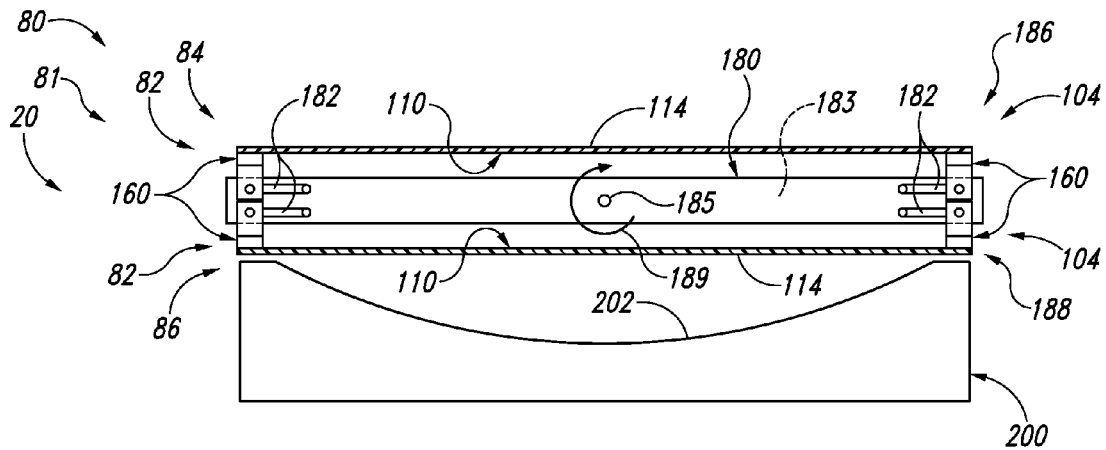
FIG. 23 is a less schematic representation of illustrative, non-exclusive examples of a double-sided rotating material transfer assembly according to the present disclosure in a stowed conformation.
Figure 24:
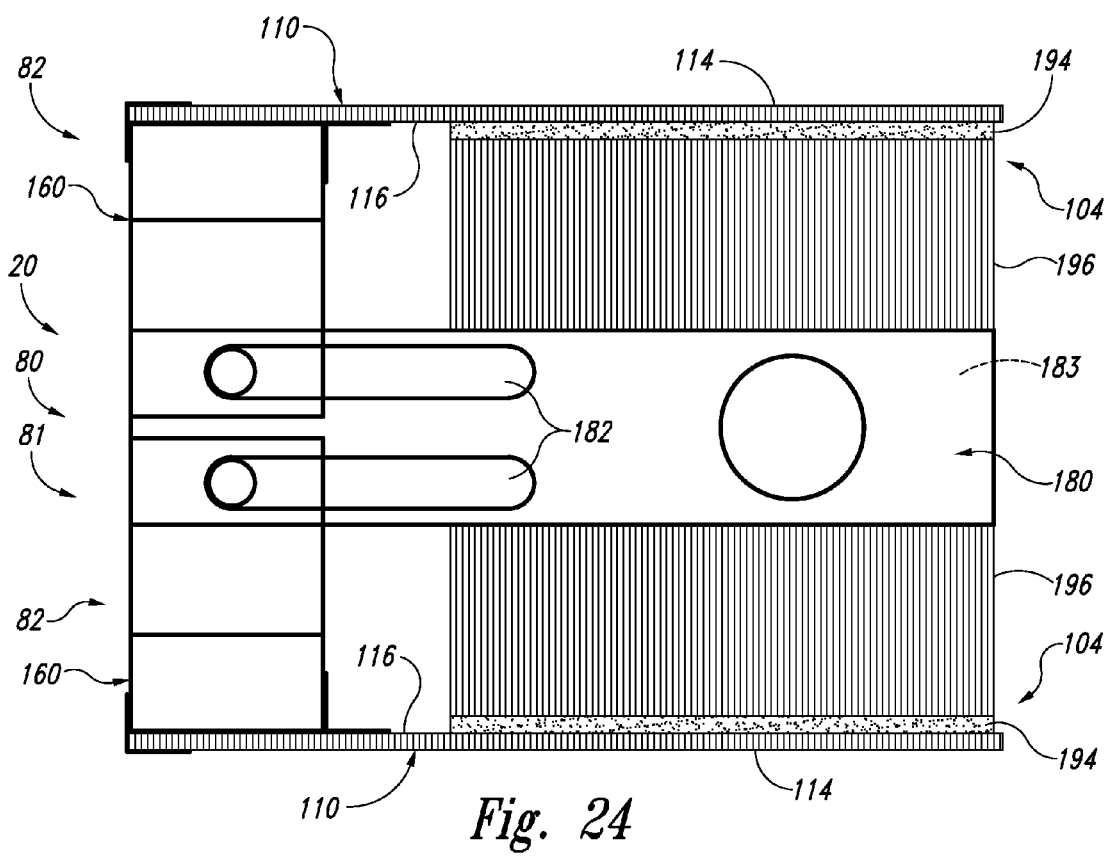
FIG. 24 is a schematic representation of a portion of the double-sided rotating material transfer assembly of FIG. 23.

FIGS. 23-24 are less schematic representations of illustrative, non-exclusive examples of a double-sided rotating material transfer assembly 81 according to the present disclosure. Double-sided rotating material transfer assembly 81, which also may be referred to herein as assembly 81, includes two chucks 82, which also may be referred to herein as first chuck 84 and second chuck 86, that are operatively attached to respective suspension structures 160. Chucks 82 may include respective flexible substrates 110 that may define respective material contacting surfaces 114. As illustrated in FIGS. 23-24, material contacting surface 114 of first chuck 84 may face away from material contacting surface 114 of second chuck 86 (or a surface normal direction of material contacting surface 114 of first chuck 84 may be opposed to a surface normal direction of material contacting surface 114 of second chuck 86).

As also illustrated in FIGS. 23-24, suspension structures 160 of chucks 82 may be operatively attached to a conformation regulating structure 180 via a plurality of attachment points 182. Thus, assembly 81 may permit independent actuation and/or transitioning of first chuck 84 and second chuck 86 between a stowed conformation 104 (as illustrated) and a deployed conformation (which may be at least substantially similar to deployed conformation 108 that is discussed herein).

A pivot 185 may permit rotation of assembly 81 about a rotational axis 189. Since assembly 81 includes two chucks 82, assembly 81 also defines two loading orientations (i.e., a first loading orientation when first chuck 84 is oriented to receive a first charge of composite material and a second loading orientation when second chuck 86 is oriented to receive a second charge of composite material). Similarly, assembly 81 also defines two application orientations (i.e., a first application orientation when first chuck 84 is oriented to locate the first charge of composite material on supporting surface 202 and a second application orientation when second chuck 86 is oriented to locate the second charge of composite material on supporting surface 202).

In the illustrative, non-exclusive example of FIG. 23, first chuck 84 is in a loading orientation 186 and second chuck 86 is in an application orientation 188. Thus, and as may be seen from FIG. 23, the first loading orientation and the second application orientation may define the same orientation as assembly 81. Similarly, the second loading orientation and the first application orientation may define the same orientation as assembly 81.

FIG. 24 is a close-up view of a portion of assembly 81 of FIG. 23. As illustrated in FIG. 24, assembly 81 (and/or any rotating material transfer assembly 80 that is disclosed herein) further may include a resilient cushion 194, which also may be referred to herein as a foam cushion 194, that may extend at least partially between conformation regulating structure 180 and flexible substrates 110. In addition, assembly 81 (and/or any rotating material transfer assembly 80 that is disclosed herein) also may include a rigid support 196 that also may extend at least partially between conformation regulating structure 180 and flexible substrates 110. Resilient cushion 194 and/or rigid support 196 may be selected and/or located to support back surface 116 of flexible substrates 110. This may increase a planarity of material contacting surface 114 of flexible substrates 110 when flexible substrates 110 are in stowed conformation 104, as illustrated.

Operation of assembly 81 may be substantially similar to operation of rotating material transfer assembly 80 that is discussed herein with reference to FIGS. 13-22. However, and since assembly 81 includes two chucks 82, composite structure fabrication assemblies 20 that include assembly 81 may fabricate a composite structure at a fabrication rate that is greater than a fabrication rate of a composite structure fabrication assembly that includes rotating material transfer assembly 80 with only a single chuck 82. As an illustrative, non-exclusive example, at least a portion of the first charge of composite material may be located on first chuck 84 concurrently with the second charge of composite material being located on and/or vacuum compacted to supporting surface 202 by second chuck 86. Similarly, at least a portion of the second charge of composite material may be located on second chuck 86 concurrently with the first charge of composite material being located on and/or vacuum compacted to supporting surface 202 by first chuck 84.

Figure 25:
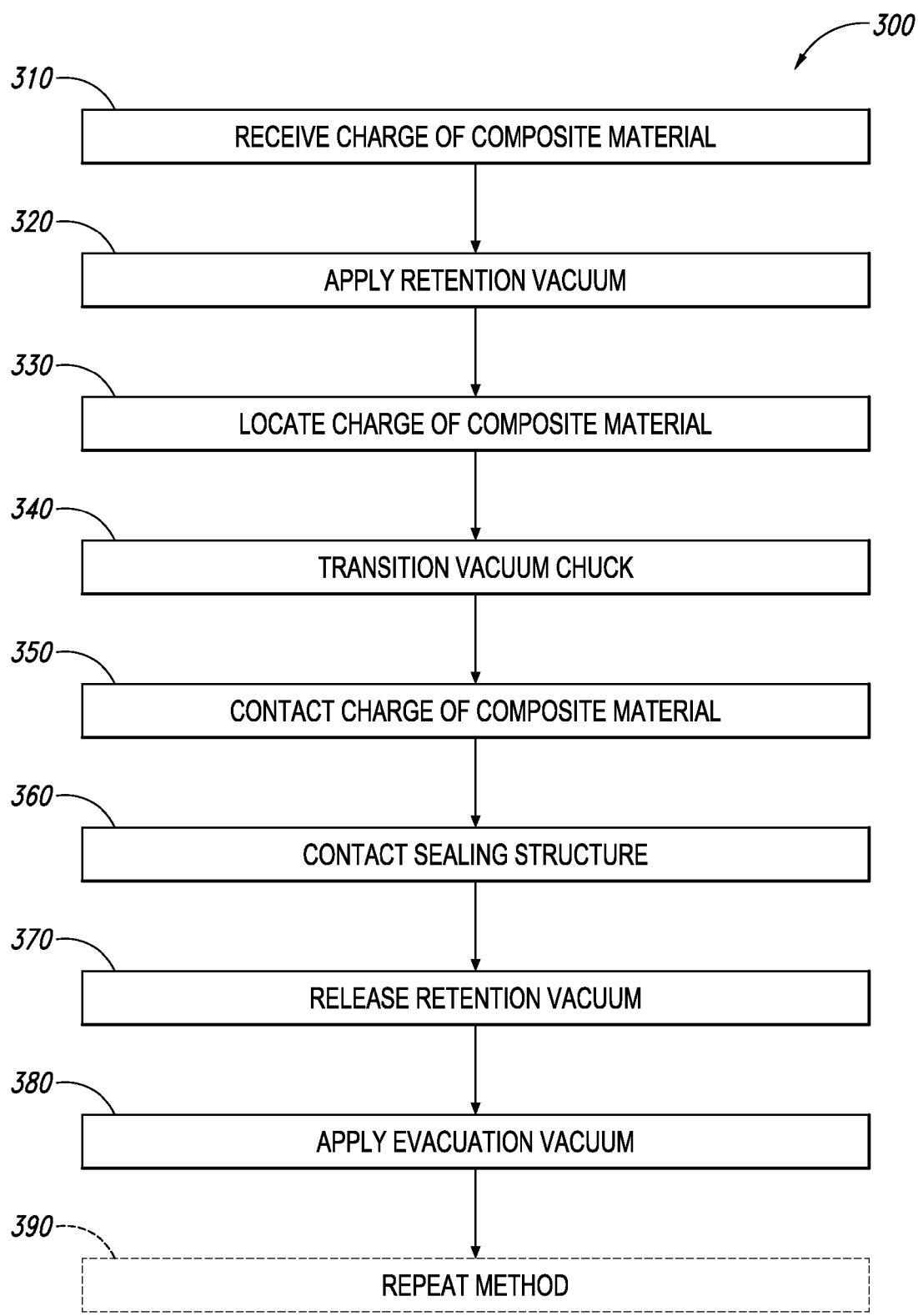
FIG. 25 is a flowchart depicting methods according to the present disclosure of assembling and compacting a composite structure.

FIG. 25 is a flowchart depicting methods 300 according to the present disclosure of assembling and compacting a composite structure. Methods 300 include receiving a charge of composite material on a material contacting surface that is defined by a flexible substrate of a vacuum chuck at 310 and applying a retention vacuum to a plurality of retention conduits that are at least partially defined by the material contacting surface at 320. Methods 300 further include locating the charge of composite material relative to a non-planar supporting surface at 330 and transitioning the vacuum chuck to a deployed conformation at 340. Methods 300 further includes contacting the charge of composite material with the supporting surface at 350, contacting a sealing structure of the vacuum chuck with the supporting surface to define an enclosed volume at 360 and releasing the retention vacuum at 370. Methods 300 further include applying an evacuation vacuum to a plurality of evacuation conduits that are at least partially defined by the material contact surface at 380 and may include repeating at least a portion of the methods at 390.

Receiving the charge of composite material on the material contacting surface at 310 may include receiving the charge of composite material on the material contacting surface while the vacuum chuck (or the flexible substrate) is in a stowed conformation. As an illustrative, non-exclusive example, the receiving at 310 may include laying up the charge of composite material on the material contacting surface, such as through the use of a layup head. As another illustrative, non-exclusive example, the receiving at 310 also may include locating, or manually locating, the charge of composite material on the material contacting surface. As yet another illustrative, non-exclusive example, the receiving at 310 also may include picking, picking up, or removing the charge of composite material from a layup surface with, or using, the vacuum chuck.

Applying the retention vacuum to the plurality of retention conduits at 320 may include applying the retention vacuum to retain (at least temporarily) the charge of composite material on the material contacting surface of the flexible substrate. This may include applying the retention vacuum during at least the locating at 330 and the transitioning at 340. It is within the scope of the present disclosure that the applying at 320 further may include applying to maintain contact, or operative attachment, between the material contacting surface and the charge of composite material during the transitioning at 340.

Locating the charge of composite material relative to a non-planar supporting surface at 330 may include moving the vacuum chuck and/or moving a layup mandrel that defines the non-planar supporting surface. This may include locating the charge of composite material proximal to and/or near the non-planar supporting surface. Additionally or alternatively, and when the vacuum chuck forms a portion of a rotating material transfer assembly, the locating at 330 also may include transitioning the rotating material transfer assembly from a loading orientation to an application orientation, as discussed herein.

Transitioning the vacuum chuck to the deployed conformation at 340 may include transitioning the vacuum chuck (and/or the flexible substrate thereof) to a deployed conformation that is different from the stowed conformation. As discussed herein, and when the vacuum chuck is in the deployed conformation, a radius of curvature of the charge of composite material may be less than a radius of curvature of the non-planar supporting surface. This may permit the contacting at 350 without wrinkling of the charge of composite material. It is within the scope of the present disclosure that the transitioning at 340 may include passively transitioning to the deployed conformation and/or transitioning to the deployed conformation responsive to a gravitational force, such as when the vacuum chuck does not include a conformation regulating structure and/or does not include an actuator that is configured to control the transitioning. Additionally or alternatively, it is also within the scope of the present disclosure that the transitioning at 340 may include actively transitioning to the deployed conformation, such as through the action of an actuator that is configured to control the transitioning at 340.

Contacting the charge of composite material with the supporting surface at 350 may include physically, mechanically, and/or directly contacting the charge of composite material with the supporting surface. This may include deforming the charge of composite material and/or conforming a surface contour of the charge of composite material to the supporting surface (and/or to a surface contour thereof).

Contacting the sealing structure of the vacuum chuck with the supporting surface to define the enclosed volume at 360 may include physically, mechanically, and/or directly contacting the sealing structure with the supporting surface. This may include defining any suitable enclosed volume that may contain the charge of composite material and that may be bounded, or defined, by the flexible substrate, the supporting surface, and the sealing structure.

Releasing the retention vacuum at 370 may include ceasing the applying at 320 and/or ceasing to retain the charge of composite material on the material contacting surface of the flexible substrate. Additionally or alternatively, the releasing at 370 also may include pressurizing the plurality of retention conduits to generate a motive force for separation of the charge of composite material from the material contacting surface. This may include pressurizing subsequent to ceasing the applying at 320, and/or pressurizing subsequent to the applying at 380.

Applying the evacuation vacuum to the plurality of evacuation conduits at 380 may include decreasing the pressure within the enclosed volume and/or compacting the charge of composite material on, or to, the non-planar supporting surface. When the vacuum chuck forms a portion of a double-sided rotating material transfer assembly, it is within the scope of the present disclosure that the applying at 380 may include applying the evacuation vacuum with a first chuck to compact a first charge of composite material and that methods 300 also may include receiving a second charge of composite material on a second material contacting surface of a second vacuum chuck (such as via the receiving, at least partially, at 310) concurrently with the applying at 380.

Repeating at least a portion of the methods at 390 may include repeating any suitable portion of methods 300. As an illustrative, non-exclusive example, the charge of composite material may be a first charge of composite material and the repeating at 390 may include locating a second, or subsequent, charge of composite material on the first charge of composite material and/or sequentially locating a plurality of charges of composite material on one or more previously located charges of composite material to define the composite structure. As an illustrative, non-exclusive example, the plurality of charges of composite material may include at least 3, at least 4, at least 5, at least 6, at least 7, at least 8, at least 10, at least 12, at least 15, or at least 20 charges of composite material. As another illustrative, non-exclusive example, the repeating at 390 may include repeating such that, or until, a number of plies, or stacked plies, of composite material within the composite structure is at least 10 plies, at least 15 plies, at least 20 plies, at least 25 plies, at least 30 plies, at least 40 plies, at least 45 plies, or at least 50 plies and/or fewer than 100 plies, fewer than 90 plies, fewer than 80 plies, fewer than 70 plies, fewer than 65 plies, fewer than 60 plies, fewer than 55 plies, fewer than 50 plies, or fewer than 45 plies.

Figure 26:
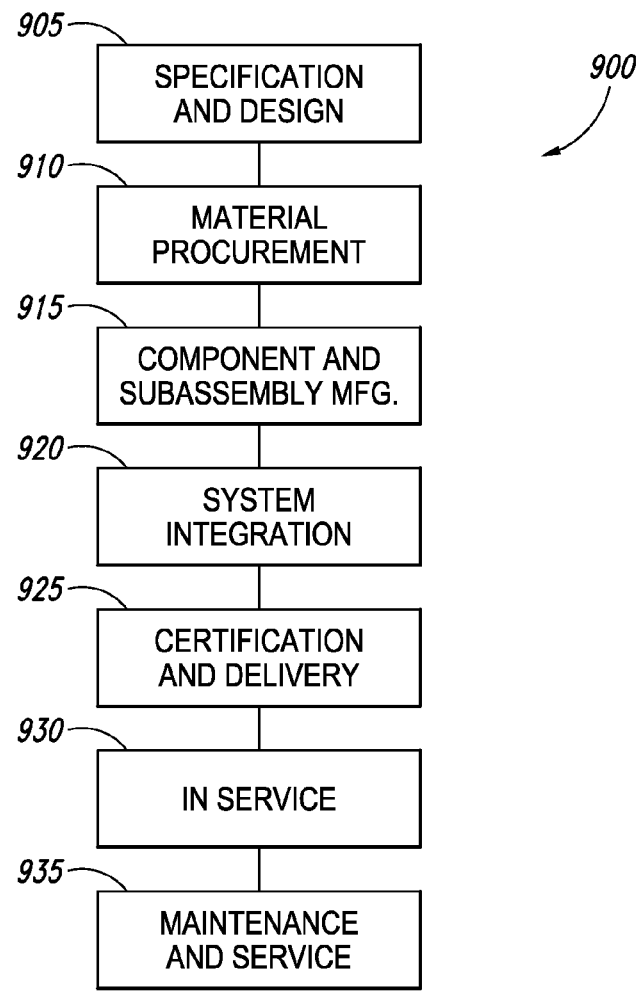
FIG. 26 is a flow diagram of aircraft production and service methodology.
Figure 27:
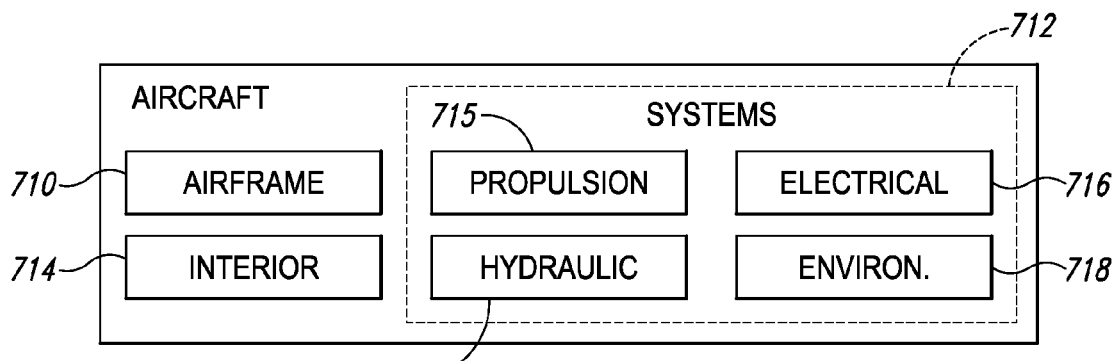
FIG. 27 is a block diagram of an aircraft.

Referring now to FIGS. 26-27, embodiments of the disclosure may be described in the context of an aircraft manufacturing and service method 900, as shown in FIG. 26, and an aircraft 700, as shown in FIG. 27. During pre-production, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 27, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A flexible material transfer device that is configured to selectively and operatively attach to a charge of composite material to permit transfer of the charge of composite material, the device comprising:

a flexible substrate that is configured to selectively and repeatedly transition between a stowed conformation and a deployed conformation that is different from the stowed conformation, optionally wherein the flexible substrate defines:
 (i) a material contacting surface that is configured to contact the charge of composite material; and
 (ii) a plurality of retention conduits that is at least partially defined by the material contacting surface, wherein the plurality of retention conduits is configured to have a retention vacuum applied thereto, and further wherein the flexible material transfer device is configured to retain the charge of composite material on the material contacting surface when the charge of composite material contacts the material contacting surface and the retention vacuum is applied to the plurality of retention conduits; and a retention manifold that optionally provides fluid communication between the plurality of retention conduits and a vacuum source to selectively apply the retention vacuum.

A2. The device of paragraph A1, wherein the flexible substrate is formed from at least one of a flexible material and a resilient material.

A3. The device of any of paragraphs A1-A2, wherein, when in the stowed conformation, the flexible substrate is a planar, or at least substantially planar, flexible substrate that further defines a back surface that is opposed to the material contacting surface.

A4. The device of any of paragraphs A1-A3, wherein the flexible substrate is defined by a first wall, a second wall, and a plurality of elongate webs that extend between the first wall and the second wall, optionally wherein the flexible substrate is one of a panel, a planar panel, a double-walled panel, and a triple-walled panel.

A5. The device of paragraph A4, wherein the first wall, the second wall, and the plurality of elongate webs define a plurality of elongate channels, optionally wherein the plurality of elongate channels extends from an edge of the flexible substrate, and further optionally wherein the plurality of elongate channels extends between a first edge of the flexible substrate and a second edge of the flexible substrate.

A6. The device of paragraph A5, wherein at least a portion of the retention manifold is defined by at least a retention portion of the plurality of elongate channels.

A7. The device of any of paragraphs A5-A6, wherein the first wall defines the material contacting surface, and further wherein the second wall defines a/the back surface of the flexible substrate that is opposed to the material contacting surface.

A8. The device of any of paragraphs A1-A7, wherein the device further includes a suspension structure that is operatively attached to the flexible substrate, and optionally to a/the back surface of the flexible substrate.

A9. The device of paragraph A8, wherein the suspension structure includes a first suspension member that is operatively attached to a first side of the flexible substrate and a second suspension member that is operatively attached to a second side of the flexible substrate, optionally wherein the first side of the flexible substrate is spaced apart from the second side of the flexible substrate, and further optionally wherein the first side of the flexible substrate is opposed to the second side of the flexible substrate.

A10. The device of paragraph A9 when dependent from any of paragraphs A5-A7, wherein the first suspension member defines a first suspension member longitudinal direction, wherein the second suspension member defines a second suspension member longitudinal direction, wherein the plurality of elongate channels defines a channel longitudinal direction, and further wherein the first suspension member longitudinal direction and the second suspension member longitudinal direction are different from, and optionally perpendicular to, the channel longitudinal direction.

A11. The device of any of paragraphs A8-A10, wherein the suspension structure is a rigid, or at least substantially rigid, suspension structure.

A12. The device of any of paragraphs A8-A11, wherein the suspension structure is a metallic suspension structure.

A13. The device of any of paragraphs A8-A12, wherein the suspension structure forms at least a portion of the retention manifold.

A14. The device of any of paragraphs A8-A13, wherein the suspension structure is a tubular suspension structure that defines an internal volume.

A15. The device of paragraph A14, wherein the tubular suspension structure further includes a suspension structure retention opening, wherein a/the back surface of the flexible substrate defines a back surface retention opening, and further wherein the suspension structure retention opening is aligned with the back surface retention opening to provide fluid communication between the internal volume of the suspension structure and the plurality of retention conduits.

A16. The device of any of paragraphs A1-A15, wherein the stowed conformation includes a planar, or at least substantially planar, conformation.

A17. The device of any of paragraphs A1-A16, wherein, when the flexible substrate is in the stowed conformation, the material contacting surface defines a planar, or at least substantially planar, surface contour.

A18. The device of any of paragraphs A1-A17, wherein the deployed conformation defines at least one of a non-planar conformation, a curved conformation, and an arcuate conformation.

A19. The device of any of paragraphs A1-A18, wherein, when the flexible substrate is in the deployed conformation, the material contacting surface defines at least one of a non-planar conformation, a curved conformation, and an arcuate conformation.

A20. The device of any of paragraphs A1-A19, wherein the flexible substrate further defines a/the back surface that is opposed to the material contacting surface, and further wherein, when the flexible substrate is in the deployed conformation, a radius of curvature of a given portion of the material contacting surface is greater than a radius of curvature of a respective portion of the back surface that is opposed to the given portion of the material contacting surface.

A21. The device of any of paragraphs A1-A20, wherein, when the flexible substrate is in the deployed conformation, the material contacting surface defines a convex surface contour.

A22. The device of any of paragraphs A1-A21, wherein the device includes the charge of composite material, wherein the charge of composite material is retained on the material contacting surface.

A23. The device of paragraph A22, wherein, when the flexible substrate is in the deployed conformation, the charge of composite material is in tension in a direction that is parallel to the material contacting surface.

A24. The device of any of paragraphs A22-A23, wherein, when the flexible substrate is in the deployed conformation, a radius of curvature of the charge of composite material is greater than a radius of curvature of the material contacting surface.

A25. The device of any of paragraphs A22-A24, wherein the device is configured to locate the charge of composite material on a supporting surface that is defined by a layup mandrel, and further wherein, when the flexible substrate is in the deployed conformation, a radius of curvature of the charge of composite material is less than a radius of curvature of a supporting surface.

B1. A flexible vacuum compaction device for compacting a charge of composite material on a supporting surface of a layup mandrel that is configured to receive the charge of composite material, wherein the device is configured to be operatively positioned relative to the supporting surface to define an enclosed volume, the device comprising:

the flexible material transfer device of any of paragraphs A1-A25;

a plurality of evacuation conduits that is at least partially defined by the material contacting surface;

a sealing structure that is configured to form a fluid seal between the supporting surface and the flexible substrate when compressed therebetween; and an evacuation manifold that provides fluid communication between the plurality of evacuation conduits and the vacuum source to selectively apply an evacuation vacuum to the enclosed volume.

B2. The device of paragraph B1 when dependent from any of paragraphs A5-A7, wherein at least a portion of the evacuation manifold is defined by at least an evacuation portion of the plurality of elongate channels.

B3. The device of paragraph B2 when dependent from any of paragraphs A14-A15, wherein the tubular suspension structure is a first tubular suspension structure that defines a first internal volume, wherein the device further includes a second tubular suspension structure that defines a second internal volume, wherein the second tubular suspension structure further includes a suspension structure evacuation opening, wherein a/the back surface of the flexible substrate defines a back surface evacuation opening, and further wherein the suspension structure evacuation opening is aligned with the back surface evacuation opening to provide fluid communication between the internal volume of the suspension structure and the plurality of evacuation conduits.

B4. The device of paragraph B3, wherein the second tubular suspension structure forms at least a portion of the evacuation manifold.

C1. A rotating material transfer assembly, comprising:
a vacuum chuck including the device of any of paragraphs A1-B4;
a conformation regulating structure that is configured to regulate a/the surface contour of the material contacting surface; and
an orientation regulating mechanism that is configured to selectively transition the vacuum chuck between a loading orientation, in which the vacuum chuck is oriented to receive the charge of composite material on the material contacting surface, and an application orientation, in which the vacuum chuck is oriented to locate the charge of composite material on a/the supporting surface.

C2. The assembly of paragraph C1, wherein the conformation regulating structure is operatively attached to a/the suspension structure that optionally is attached to at least one of the flexible substrate and a/the back surface of the flexible substrate.

C3. The assembly of paragraph C2, wherein the conformation regulating structure includes a slot that permits translation of the conformation regulating structure relative to the suspension structure when the vacuum chuck transitions between the stowed conformation and the deployed conformation.

C4. The assembly of any of paragraphs C2-C3, wherein the conformation regulating structure is operatively attached to the suspension structure at an attachment point, and further wherein the attachment point permits rotation of the suspension structure relative to the conformation regulating structure.

C5. The assembly of any of paragraphs C2-C4, wherein the conformation regulating structure defines a conformation regulating structure longitudinal axis, wherein the suspension structure defines a suspension structure longitudinal axis, and further wherein the conformation regulating structure longitudinal axis is at least substantially perpendicular to the suspension structure longitudinal axis.

C6. The assembly of any of paragraphs C1-C5, wherein the conformation regulating structure includes a beam, optionally a rigid beam, and further optionally an at least substantially rigid beam.

C7. The assembly of any of paragraphs C1-C6, wherein the conformation regulating structure further includes an actuator that is configured to selectively regulate the transition between the stowed conformation and the deployed conformation, and optionally wherein the actuator includes at least one of a mechanical actuator, a hydraulic actuator, an electronic actuator, and a pneumatic actuator.

C8. The assembly of any of paragraphs C1-C7, wherein the assembly further includes a central support beam that is optionally operatively attached to the conformation regulating structure.

C9. The assembly of paragraph C8, wherein the conformation regulating structure defines a/the conformation regulating structure longitudinal axis, wherein the central support beam defines a support beam longitudinal axis, and further wherein the conformation regulating structure longitudinal axis is at least substantially perpendicular to the support beam longitudinal axis.

C10. The assembly of any of paragraphs C8-C9, wherein the central support beam is located to support, and optionally contact, a/the back surface of the flexible substrate when the vacuum chuck is in the stowed conformation.

C11. The assembly of any of paragraphs C1-C10, wherein the orientation regulating mechanism includes a pivot that is configured to permit rotation of the vacuum chuck about a rotational axis to permit the transition between the loading orientation and the application orientation.

C12. The assembly of paragraph C11, wherein the pivot is operatively attached to a/the central support beam.

C13. The assembly of any of paragraphs C11-C12, wherein the pivot is located such that the rotational axis passes through a center of mass of the vacuum chuck.

C14. The assembly of any of paragraphs C1-C13, wherein the assembly further includes a translation mechanism that is configured to translate the vacuum chuck relative to the supporting surface.

C15. The assembly of any of paragraphs C1-C14, wherein the loading orientation is opposed to, or at least substantially opposed to, the application orientation.

C16. The assembly of any of paragraphs C1-C15, wherein the material contacting surface faces in a vertical, or at least substantially vertical, direction when the vacuum chuck is in the loading orientation.

C17. The assembly of any of paragraphs C1-C16, wherein the material contacting surface faces away from, or at least substantially away from, the supporting surface when the vacuum chuck is in the loading orientation.

C18. The assembly of any of paragraphs C1-C17, wherein the material contacting surface does not face the supporting surface when the vacuum chuck is in the loading orientation.

C19. The assembly of any of paragraphs C1-C18, wherein the material contacting surface faces the supporting surface when the vacuum chuck is in the application orientation.

C20. The assembly of any of paragraphs C1-C19, wherein the vacuum chuck is a first vacuum chuck that defines a first material contacting surface, and further wherein the assembly further includes a second vacuum chuck that optionally includes the device of any of paragraphs A1-84 that defines a second material contacting surface.

C21. The assembly of paragraph C20, wherein a surface normal direction of the first material contacting surface is opposed to a surface normal direction of the second material contacting surface.

C22. The assembly of any of paragraphs C20-C21, wherein the assembly defines a first loading orientation when the first vacuum chuck is oriented to receive the charge of composite material, wherein the assembly defines a second loading orientation when the second vacuum chuck is oriented to receive the charge of composite material, wherein the assembly defines a first application orientation when the first vacuum chuck is oriented to locate a first charge of composite material on the supporting surface, and further wherein the assembly defines a second application orientation when the second vacuum chuck is oriented to locate a second charge of composite material on the supporting surface.

C23. The assembly of paragraph C22, wherein the first loading orientation and the second application orientation define the same orientation.

C24. The assembly of any of paragraphs C22-C23, wherein the second loading orientation and the first application orientation define the same orientation.

C25. The assembly of any of paragraphs C20-C24, wherein the second vacuum chuck is at least substantially similar to the first vacuum chuck.

C26. The assembly of any of paragraphs C20-C25, wherein the flexible substrate is a first flexible substrate, wherein the assembly includes a first suspension structure that is operatively attached to the first flexible substrate, and further wherein the second vacuum chuck includes a second flexible substrate and a second suspension structure that is operatively attached to the second flexible substrate.

C27. The assembly of paragraph C26, wherein the first suspension structure and the second suspension structure are operatively attached to a/the conformation regulating structure, and optionally to the same conformation regulating structure.

C28. The assembly of any of paragraphs C1-C27, wherein the assembly includes the vacuum source.

C29. The assembly of any of paragraphs C1-C28, wherein the assembly further includes a vacuum control assembly that is configured to selectively control application of at least one of the retention vacuum and a/the evacuation vacuum D1. A method of assembling and compacting a plurality of plies of compliant material on a non-planar supporting surface to define a composite structure, the method comprising:

receiving a charge of composite material on a material contacting surface that is defined by a flexible substrate of a vacuum chuck, wherein the receiving includes receiving while the vacuum chuck is in a stowed conformation;

applying a retention vacuum to a plurality of retention conduits that are at least partially defined by the material contacting surface to retain the charge of composite material on the material contacting surface;

locating the charge of composite material relative to the non-planar supporting surface;

transitioning the vacuum chuck to a deployed conformation that is different from the stowed conformation, wherein when the vacuum chuck is in the deployed conformation, a radius of curvature of the charge of composite material is less than a radius of curvature of the non-planar supporting surface;

contacting the charge of composite material with the non-planar supporting surface and conforming a surface contour of the charge of composite material to the non-planar supporting surface;

contacting a sealing structure of the vacuum chuck with the non-planar supporting surface to define an enclosed volume that is bounded by the flexible substrate, the non-planar supporting surface, and the sealing structure;

releasing the retention vacuum; and applying an evacuation vacuum to a plurality of evacuation conduits that are at least partially defined by the material contacting surface to compact the charge of composite material on the non-planar supporting surface.

D2. The method of paragraph D1, wherein the charge of composite material is a first charge of composite material, and further wherein the method includes repeating the method to locate a second charge of composite material on the first charge of composite material and to compact the second charge of composite material to the first charge of composite material.

D3. The method of paragraph D2, wherein the repeating includes repeating a plurality of times to locate and compact a respective plurality of charges of composite material on the non-planar supporting surface, wherein the plurality of charges of composite material includes at least 3, at least 4, at least 5, at least 6, at least 7, at least 8, at least 10, at least 12, at least 15, or at least 20 charges of composite material.

D4. The method of any of paragraphs D2-D3, wherein the repeating includes repeating such that a number of plies of composite material within the composite structure is at least one of:

(i) at least 10 plies, at least 15 plies, at least 20 plies, at least 25 plies, at least 30 plies, at least 40 plies, at least 45 plies, or at least 50 plies; and (ii) fewer than 100 plies, fewer than 90 plies, fewer than 80 plies, fewer than 70 plies, fewer than 65 plies, fewer than 60 plies, fewer than 55 plies, fewer than 50 plies, or fewer than 45 plies.

D5. The method of any of paragraphs D1-D4, wherein the transitioning includes selectively transitioning to the deployed conformation, optionally wherein the selectively transitioning includes actuating a conformation regulating structure.

D6. The method of any of paragraphs D1-D5, wherein the method further includes pressurizing the plurality of retention conduits to generate a motive force for separation of the charge of composite material from the material contacting surface, optionally wherein the pressurizing is subsequent to at least one of the releasing the retention vacuum and the applying the evacuation vacuum.

D7. The method of any of paragraphs D1-D6, wherein the receiving includes laying up the charge of composite material on the material contacting surface.

D8. The method of any of paragraphs D1-D7, wherein the receiving includes locating the charge of composite material on the material contacting surface.

D9. The method of any of paragraphs D1-D8, wherein the receiving includes picking the charge of composite material from a layup surface with the vacuum chuck.

D10. The method of any of paragraphs D1-D9, wherein the vacuum chuck is a first vacuum chuck, wherein the charge of composite material is a first charge of composite material, and wherein, concurrently with the applying the evacuation vacuum, the method further includes receiving a second charge of composite material on a second material contacting surface that is defined by a second flexible substrate of a second vacuum chuck.

D11. The method of any of paragraphs D1-D10, wherein the vacuum chuck includes the device of any of paragraphs A1-34.

D12. The method of any of paragraphs D1-D11, wherein the method is performed using the rotating material transfer assembly of any of paragraphs C1-C29.

E1. The device of any of paragraphs A1-34, the assembly of any of paragraphs C1-C29, or the method of any of paragraphs D1-D12, wherein the charge of composite material includes at least one of:

(i) at least 1 composite ply;

(ii) at least 2, at least 3, at least 4, at least 5, at least 6, at least 8, or at least 10 stacked composite plies; and (iii) fewer than 20, fewer than 15, fewer than 10, fewer than 8, fewer than 6, fewer than 5, fewer than 4, or fewer than 3 stacked composite plies.

E2. The device of any of paragraphs A1-34 or E1, the assembly of any of paragraphs C1-C29 or E1, or the method of any of paragraphs D1-E1, wherein the charge of composite material includes a pre-impregnated material.

E3. The device of any of paragraphs A1-B4 or E1-E2, the assembly of any of paragraphs C1-C29 or E1-E2, or the method of any of paragraphs D1-E1-E2, wherein the charge of composite material includes a plurality of fibers, optionally wherein the plurality of fibers includes at least one of a plurality of carbon fibers, a plurality of polymeric fibers, and a plurality of glass fibers.

E4. The device of any of paragraphs A1-B4 or E1-E3, the assembly of any of paragraphs C1-C29 or E1-E3, or the method of any of paragraphs D1-E1-E3, wherein the charge of composite material includes a resin material, optionally wherein the resin material includes at least one of an epoxy, an adhesive, and a polymeric resin.

E5. The device of any of paragraphs A1-B4 or E1-E4, the assembly of any of paragraphs C1-C29 or E1-E4, or the method of any of paragraphs D1-E1-E4, wherein the supporting surface defines a two-dimensional surface contour.

E6. The device of any of paragraphs A1-B4 or E1-E5, the assembly of any of paragraphs C1-C29 or E1-E5, or the method of any of paragraphs D1-E1-E5, wherein the supporting surface defines a three-dimensional surface contour.

E7. The device of any of paragraphs A1-B4 or E1-E6, the assembly of any of paragraphs C1-C29 or E1-E6, or the method of any of paragraphs D1-E1-E6, wherein a surface contour of the supporting surface defines a surface contour of at least a portion of at least one of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

E8. The device of any of paragraphs A1-B4 or E1-E7, the assembly of any of paragraphs C1-C29 or E1-E7, or the method of any of paragraphs D1-E1-E7, wherein the material contacting surface defines a surface area of at least one of:

(i) at least 1 square meter, at least 2 square meters, at least 3 square meters, at least 4 square meters, at least 6 square meters, at least 8 square meters, at least 10 square meters, at least 12 square meters, at least 15 square meters, or at least 20 square meters; and (ii) fewer than 50 square meters, fewer than 45 square meters, fewer than 40 square meters, fewer than 35 square meters, fewer than 30 square meters, fewer than 25 square meters, or fewer than 20 square meters.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A flexible vacuum compaction device for compacting a charge of composite material on a supporting surface of a layup mandrel that is configured to receive the charge of composite material, wherein the device is configured to be operatively positioned relative to the supporting surface to define an enclosed volume, the device comprising:

a flexible substrate that is configured to selectively and repeatedly transition between a stowed conformation and a deployed conformation that is different from the stowed conformation, wherein the flexible substrate defines:

(i) a material contacting surface that is configured to contact the charge of composite material;

(ii) a plurality of retention conduits that is at least partially defined by the material contacting surface, wherein the plurality of retention conduits is configured to have a retention vacuum applied thereto, and further wherein the flexible vacuum compaction device is configured to retain the charge of composite material on the material contacting surface when the charge of composite material contacts the material contacting surface and the retention vacuum is applied to the plurality of retention conduits; and (iii) a plurality of evacuation conduits that is at least partially defined by the material contacting surface;

a retention manifold that provides fluid communication between the plurality of retention conduits and a vacuum source to selectively apply the retention vacuum;

an evacuation manifold that provides fluid communication between the plurality of evacuation conduits and the vacuum source to selectively apply an evacuation vacuum to the enclosed volume; and a sealing structure that is configured to form a fluid seal between the supporting surface and the flexible substrate when compressed therebetween.

2. The device of claim 1, wherein the flexible substrate is formed from at least one of a flexible material and a resilient material.

3. The device of claim 1, wherein the flexible substrate is defined by a first wall, a second wall, and a plurality of elongate webs that extends between the first wall and the second wall, wherein the first wall, the second wall, and the plurality of elongate webs define a plurality of elongate channels, and further wherein at least a portion of the retention manifold is defined by at least a retention portion of the plurality of elongate channels.

4. The device of claim 1, wherein the device further includes a suspension structure that is operatively attached to the flexible substrate, wherein the suspension structure includes a first suspension member that is operatively attached to a first side of the flexible substrate and a second suspension member that is operatively attached to a second side of the flexible substrate.

5. The device of claim 4, wherein the suspension structure forms at least a portion of the retention manifold.

6. The device of claim 4, wherein the suspension structure is a tubular suspension structure that defines an internal volume, wherein the tubular suspension structure further includes a suspension structure retention opening, wherein a back surface of the flexible substrate defines a back surface retention opening, and further wherein the suspension structure retention opening is aligned with the back surface retention opening to provide fluid communication between the internal volume of the suspension structure and the plurality of retention conduits.

7. The device of claim 1, wherein the stowed conformation includes an at least substantially planar conformation.

8. The device of claim 1, wherein the deployed conformation defines at least one of a non-planar conformation, a curved conformation, and an arcuate conformation.

9. The device of claim 1, wherein, when the flexible substrate is in the deployed conformation, the material contacting surface defines a convex surface contour.

10. The device of claim 3, wherein at least a portion of the evacuation manifold is defined by at least an evacuation portion of the plurality of elongate channels.

11. The device of claim 4, wherein the suspension structure is a tubular suspension structure that defines an internal volume, wherein the tubular suspension structure further includes a suspension structure evacuation opening, wherein a back surface of the flexible substrate defines a back surface evacuation opening, and further wherein the suspension structure evacuation opening is aligned with the back surface evacuation opening to provide fluid communication between the internal volume of the suspension structure and the plurality of evacuation conduits.

12. The device of claim 11, wherein the tubular suspension structure forms at least a portion of the evacuation manifold.

13. A rotating material transfer assembly, comprising:
a vacuum chuck including the flexible vacuum compaction device of claim 1;
a conformation regulating structure that is configured to regulate a surface contour of the material contacting surface; and
an orientation regulating mechanism that is configured to selectively transition the vacuum chuck between a loading orientation, in which the vacuum chuck is oriented to receive the charge of composite material on the material contacting surface, and an application orientation, in which the vacuum chuck is oriented to locate the charge of composite material on the supporting surface.

14. The assembly of claim 13, wherein the conformation regulating structure is operatively attached to a suspension structure that is attached to at least one of the flexible substrate and a back surface of the flexible substrate.

15. The assembly of claim 14, wherein the conformation regulating structure includes a slot that permits translation of the conformation regulating structure relative to the suspension structure when the vacuum chuck transitions between the stowed conformation and the deployed conformation.

16. The assembly of claim 13, wherein the assembly further includes a central support beam that is operatively attached to the conformation regulating structure.

17. The assembly of claim 13, wherein the orientation regulating mechanism includes a pivot that is configured to permit rotation of the vacuum chuck about a rotational axis to permit the transition between the loading orientation and the application orientation.

* * * * *